US012557726B2

(12) United States Patent
Urbaniak et al.

(10) Patent No.: US 12,557,726 B2
(45) Date of Patent: Feb. 24, 2026

(54) REVERSIBLE SEED TRENCH APPURTENANCE ASSEMBLY

(71) Applicant: Precision Planting LLC, Tremont, IL (US)

(72) Inventors: William Douglas Urbaniak, Mackinaw, IL (US); Dale M. Koch, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 597 days.

(21) Appl. No.: 17/997,858

(22) PCT Filed: May 10, 2021

(86) PCT No.: PCT/IB2021/053942
§ 371 (c)(1),
(2) Date: Nov. 3, 2022

(87) PCT Pub. No.: WO2021/234503
PCT Pub. Date: Nov. 25, 2021

(65) Prior Publication Data
US 2023/0148468 A1 May 18, 2023

Related U.S. Application Data

(60) Provisional application No. 63/026,957, filed on May 19, 2020.

(51) Int. Cl.
*A01C 5/06* (2006.01)
*A01C 7/20* (2006.01)

(52) U.S. Cl.
CPC .............. *A01C 5/068* (2013.01); *A01C 7/201* (2013.01)

(58) Field of Classification Search
CPC ................................ A01C 5/068; A01C 7/201
See application file for complete search history.

(56) References Cited

U.S. PATENT DOCUMENTS

| | | | |
|---|---|---|---|
| 4,253,412 A | 3/1981 | Hogenson | |
| 5,092,255 A | 3/1992 | Long et al. | |
| (Continued) | | | |

FOREIGN PATENT DOCUMENTS

| | | |
|---|---|---|
| EP | 3158844 A1 | 4/2017 |
| WO | 2012129442 A2 | 9/2012 |
| (Continued) | | |

OTHER PUBLICATIONS

European Patent Office, International Search Report related to International Patent Application No. PCT/IB2021/053942 mail date Jul. 21, 2021.

(Continued)

*Primary Examiner* — Alicia Torres

(57) ABSTRACT

A reversible seed trench appurtenance including: a mounting frame operably connectable to an optional mounting bracket; a frame connected to the mounting frame, the frame having a first side and a second side; a neck body comprising a neck, wherein the neck body is fixedly connected to the frame or the neck body is connected to the mounting frame; a tail connected to the neck body; a post; and a hook; wherein the hook is engageable with the post; and wherein one of: (i) the post is disposed between the first side and the second side, and the neck body further comprises the hook; or (ii) the hook comprises a first hook and a second hook, the first side comprises the first hook, the second side comprises the second hook, and the neck body further comprises the post.

12 Claims, 40 Drawing Sheets

(56)                    References Cited

U.S. PATENT DOCUMENTS

| | | | |
|---|---|---|---|
| 5,724,903 A * | 3/1998 | Yoder | .................... A01C 5/068 |
| | | | 111/194 |
| 6,082,274 A | 7/2000 | Peter | |
| 6,666,156 B1 | 12/2003 | Mayerle et al. | |
| 7,497,174 B2 * | 3/2009 | Sauder | .................... A01C 7/06 |
| | | | 111/163 |
| 8,356,563 B2 | 1/2013 | Schaffert et al. | |
| 9,374,942 B2 * | 6/2016 | Schaffert | ............... A01C 7/201 |
| 9,723,777 B2 * | 8/2017 | Schaffert | ............... A01C 5/068 |
| 2005/0061219 A1 | 3/2005 | Sauder et al. | |
| 2016/0262304 A1 | 9/2016 | Hagny et al. | |
| 2017/0086362 A1 | 3/2017 | Natarjan et al. | |

FOREIGN PATENT DOCUMENTS

| | | | | |
|---|---|---|---|---|
| WO | WO-2014066664 A1 * | 5/2014 | ............... | A01C 7/20 |
| WO | 2016205424 A1 | 12/2016 | | |
| WO | WO-2020049467 A1 * | 3/2020 | ............. | A01C 5/068 |

OTHER PUBLICATIONS

UK Intellectual Property Office, Search report for related UK Application No. GB2008067.7, dated Nov. 12, 2020.

* cited by examiner

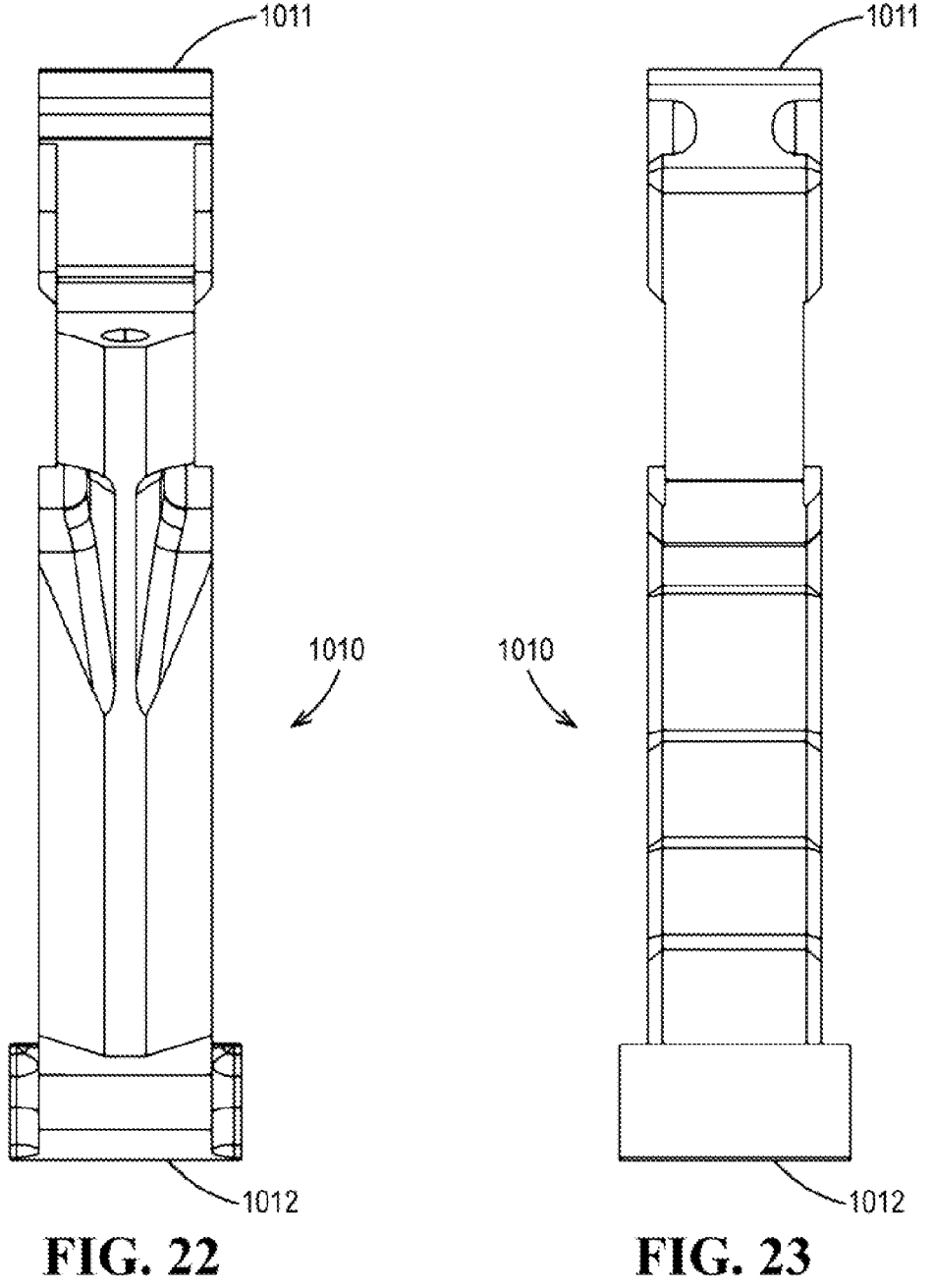
FIG. 22        FIG. 23

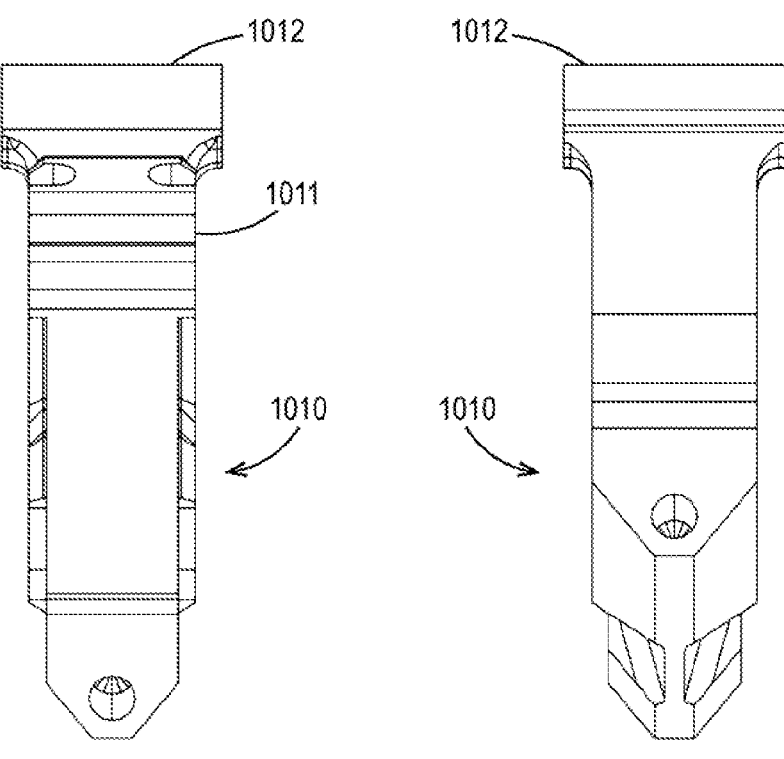
FIG. 24                    FIG. 25
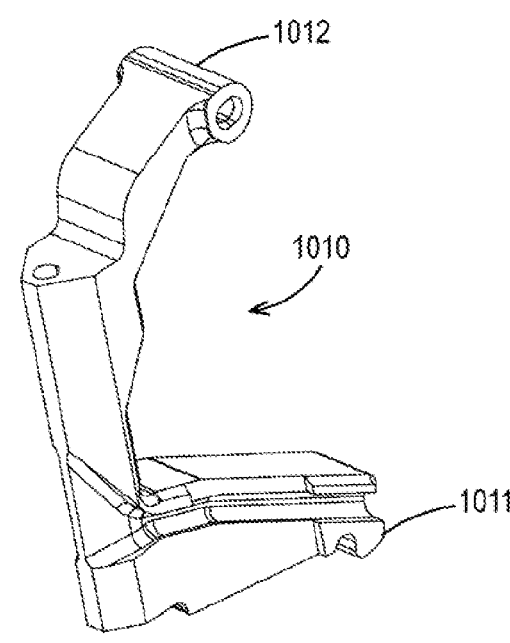
FIG. 26

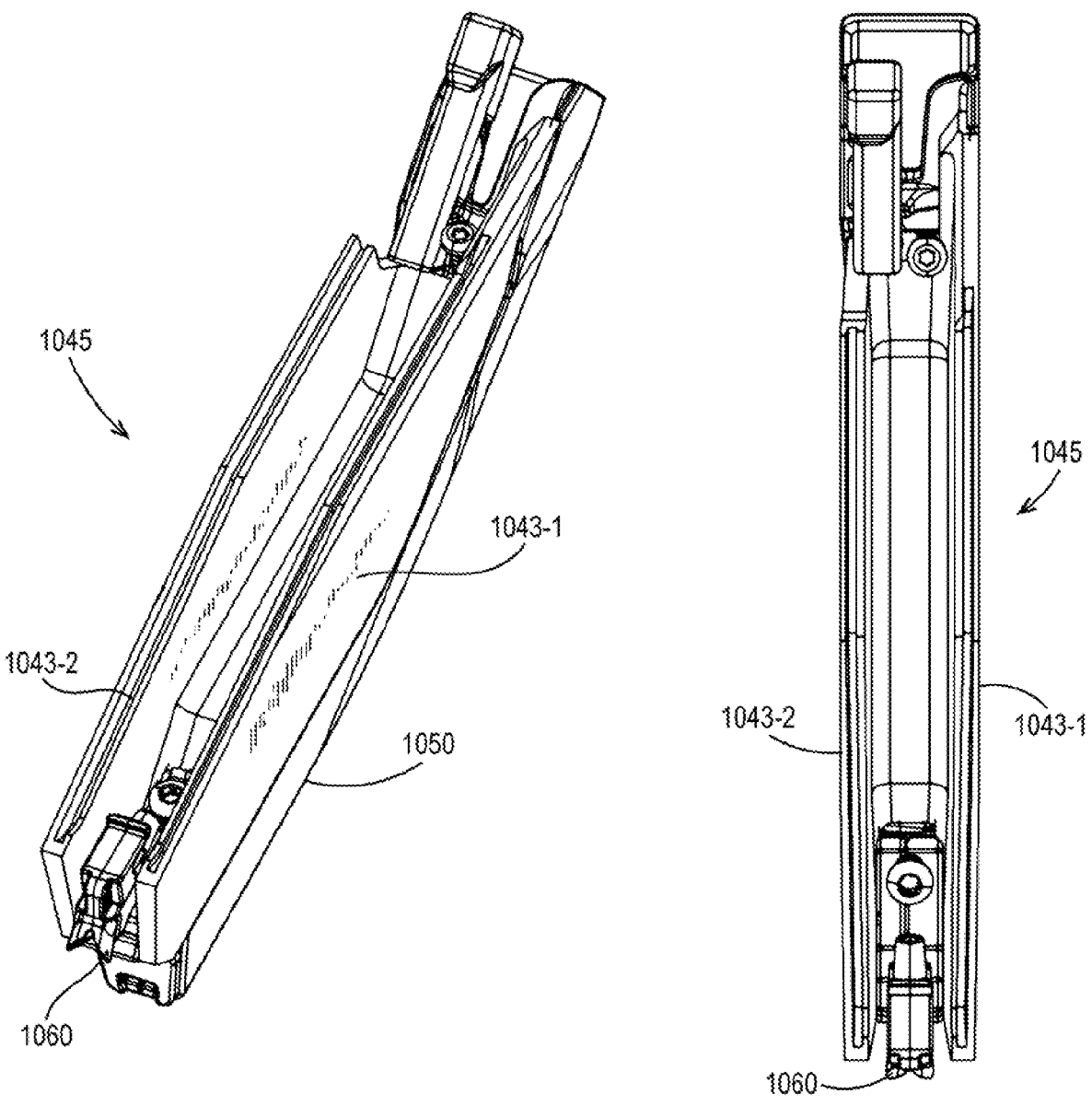
FIG. 39            FIG. 40

1050

1050

1050

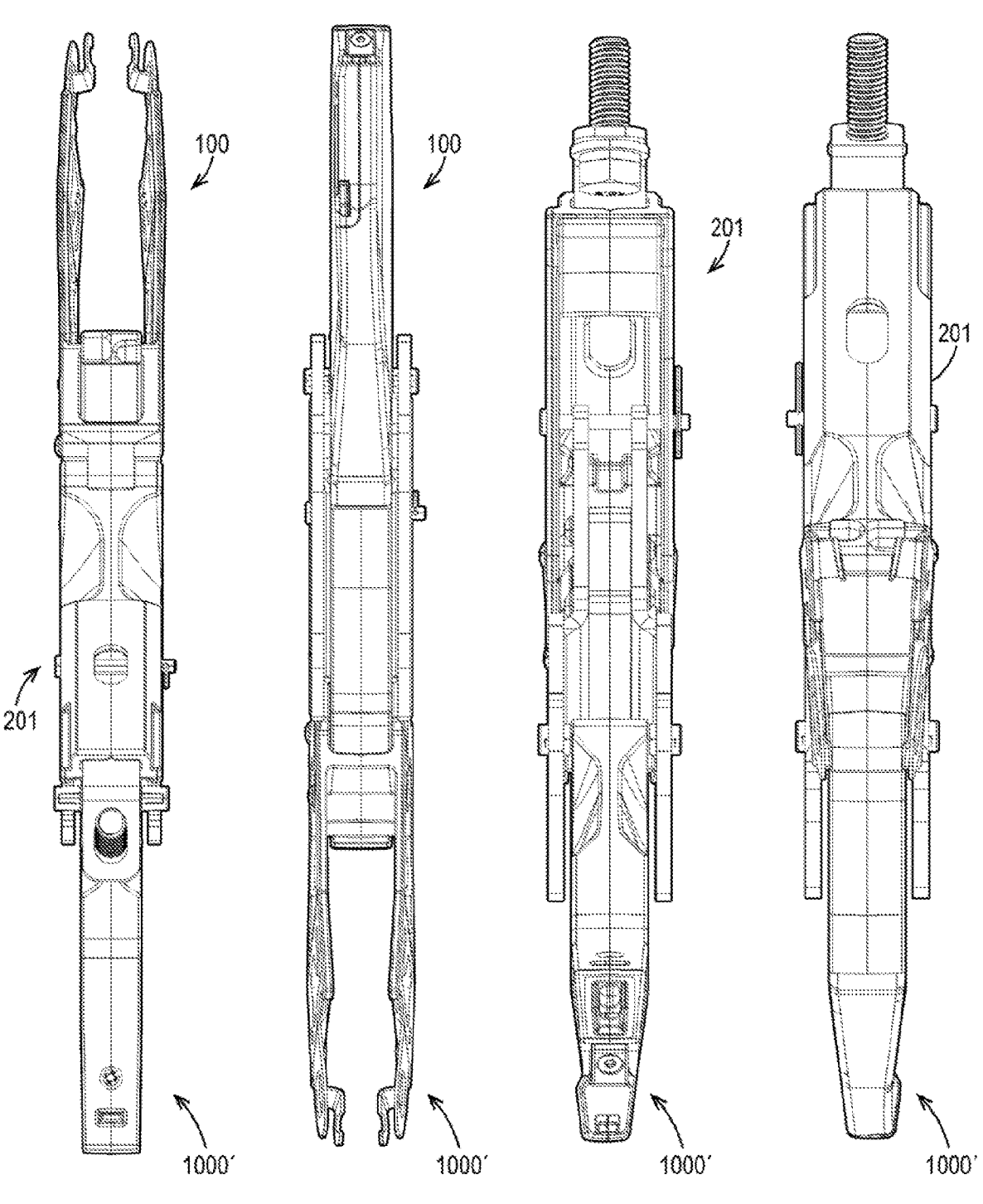
FIG. 57      FIG. 58      FIG. 59      FIG. 60

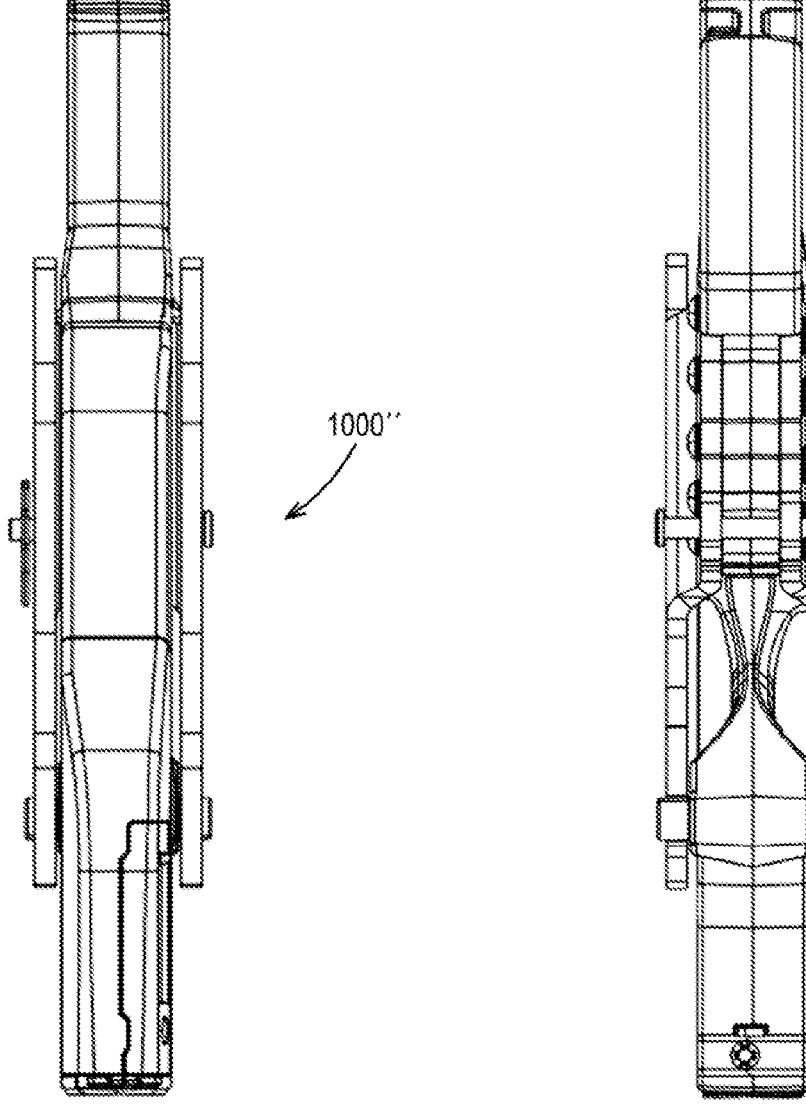
1000''
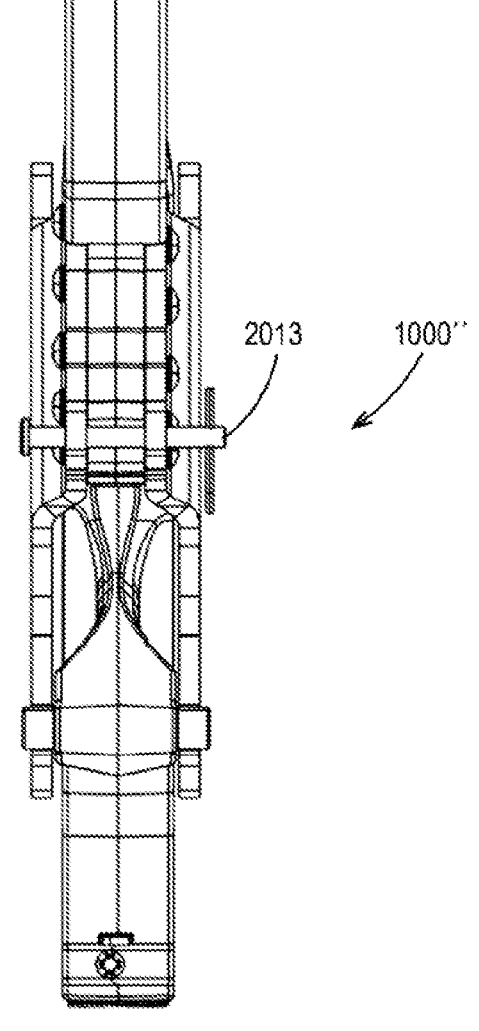
2013   1000''
FIG. 83                    FIG. 84

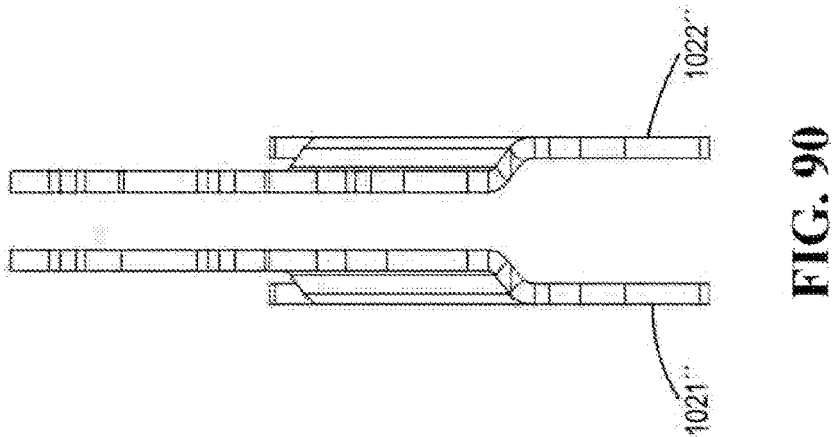
FIG. 90
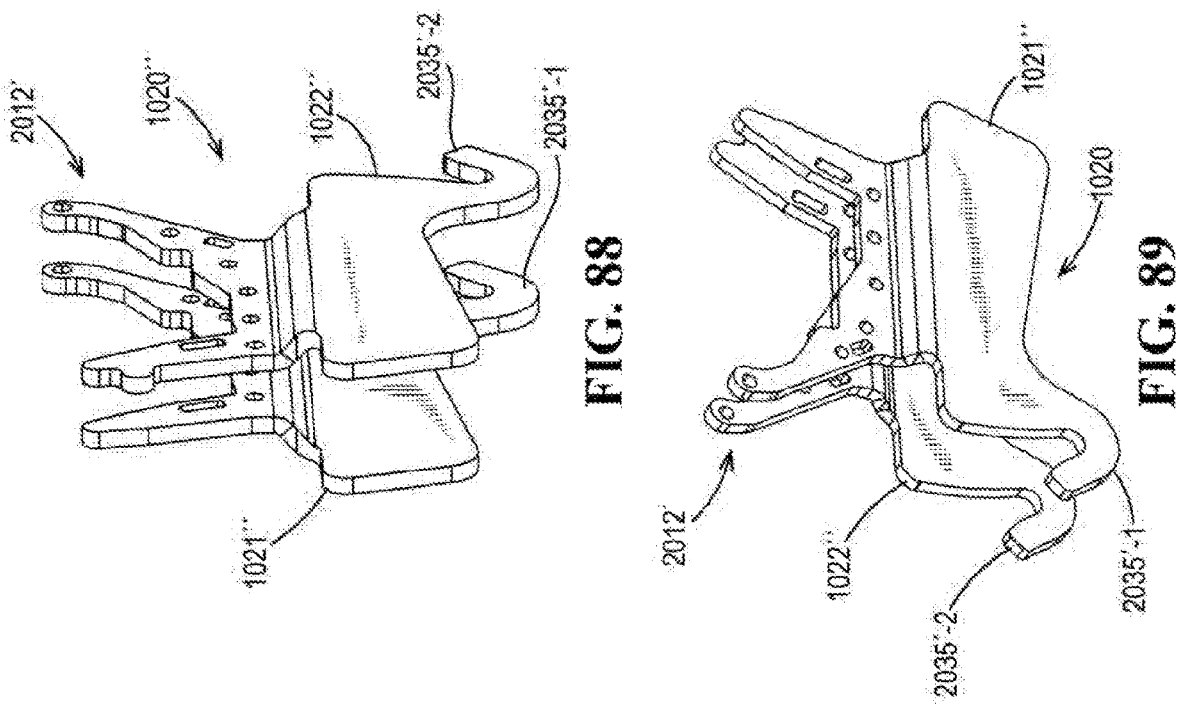
FIG. 88
FIG. 89

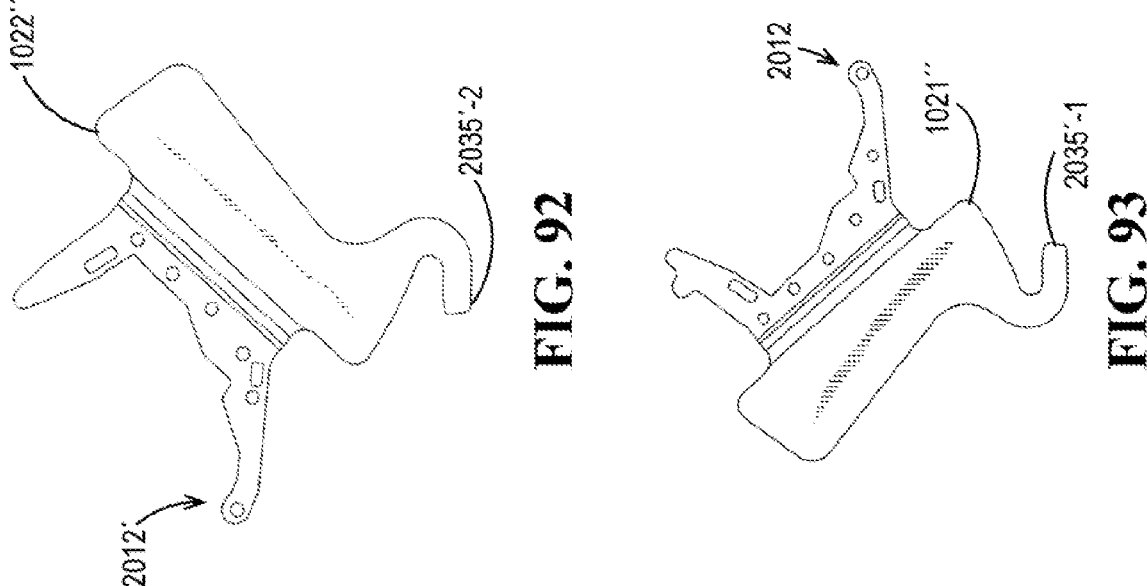
FIG. 92
FIG. 93
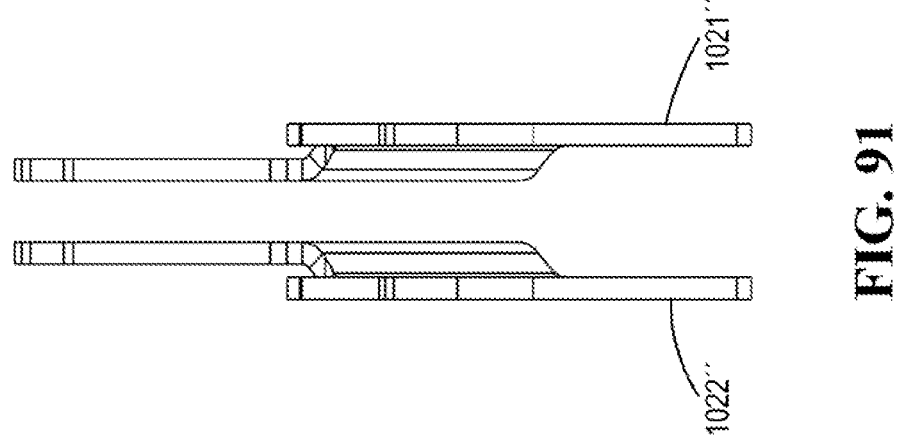
FIG. 91

REVERSIBLE SEED TRENCH APPURTENANCE ASSEMBLY

CROSS REFERENCE TO RELATED APPLICATIONS

This application is a national phase entry under 35 U.S.C. § 371 of International Patent Application PCT/IB2021/053942, filed May 10, 2021, designating the United States of America and published in English as International Patent Publication WO2021/234503 A1 on Nov. 25, 2021, which claims priority to U.S. Ser. No. 63/026,957, filed on 19 May 2020, the contents of which are incorporated herein by reference in its entirety.

BACKGROUND

Seed trench appurtenances, such as seed firmers, seed rebounders, seed deflectors, and the like, are well known in the art. Seed rebounders or seed deflectors are intended to prevent or minimize seed roll or seed bounce as the seeds are deposited in the seed trench. Seed firmers are configured to engage the seeds to press or "firm" the seeds into the bottom of the seed trench to ensure good seed-to-soil contact and promoting better seed germination. Such seed trench appurtenances are typically mounted by a bracket attached to the shank of the planter or to the seed tube with the distal end of the firmer positioned in the bottom of the seed trench rearward of the seed tube so as to pass over the seeds after the seeds are deposited in the seed trench.

During planting operations, it is sometimes necessary to reverse the planter. Usually, the operator will raise the row units out of the ground before reversing, but an operator may occasionally forget to do so resulting in the seed trench appurtenance digging into the soil as the planter is reversed and causing the appurtenance or the brackets holding the appurtenance to bend or break. An example of a reversible seed trench appurtenance can be found in PCT Publication No. WO2020049467.

Accordingly, there is a need in the industry for seed firmers and other seed trench appurtenances to be mounted or otherwise adapted so that if the planter is reversed without first raising the row units above the soil, the seed trench appurtenance or the bracket holding the seed trench appurtenance will not be damaged.

BRIEF DESCRIPTION OF THE DRAWINGS

FIG. 22 is a bottom plan view of the mounting frame of FIG. 19.

FIG. 23 is a top plan view of the mounting frame of FIG. 19.

FIG. 24 is a front elevation view of the mounting frame of FIG. 19.

FIG. 25 is a rear elevation view of the mounting frame of FIG. 19.

FIG. 26 is a bottom perspective view of the mounting frame of FIG. 19.

FIG. 39 is a perspective view of a lower tail of the reversible seed trench appurtenance of FIG. 4.

FIG. 40 is a top plan view of the lower tail of FIG. 39.

FIG. 44 is a bottom plan view of the cover of the lower tail of FIG. 39.

FIG. 57 is a top plan view of the seed trench appurtenance of FIG. 54.

FIG. 58 is a bottom plan view of the seed trench appurtenance of FIG. 54.

FIG. 59 is a rear elevation view of the seed trench appurtenance of FIG. 54.

FIG. 60 is a front elevation view of the seed trench appurtenance of FIG. 54.

FIG. 83 is a bottom plan view of the seed trench appurtenance of FIG. 78.

FIG. 84 is a top plan view of the seed trench appurtenance of FIG. 78.

FIG. 88 is a perspective view of the frame of the seed trench appurtenance of FIG. 72.

FIG. 89 is a perspective view of the frame of FIG. 88.

FIG. 90 is a top plan view of the frame of FIG. 88.

FIG. 91 is a bottom plan view of the frame of FIG. 88.

FIG. 92 is a right side elevation view of the left side of the frame of FIG. 88.

FIG. 93 is a left side elevation view of the right side of the frame of FIG. 88.

DESCRIPTION

All references cited herein are incorporated herein in their entireties. If there is a conflict between a definition herein and in an incorporated reference, the definition herein shall control.

Figure 1:
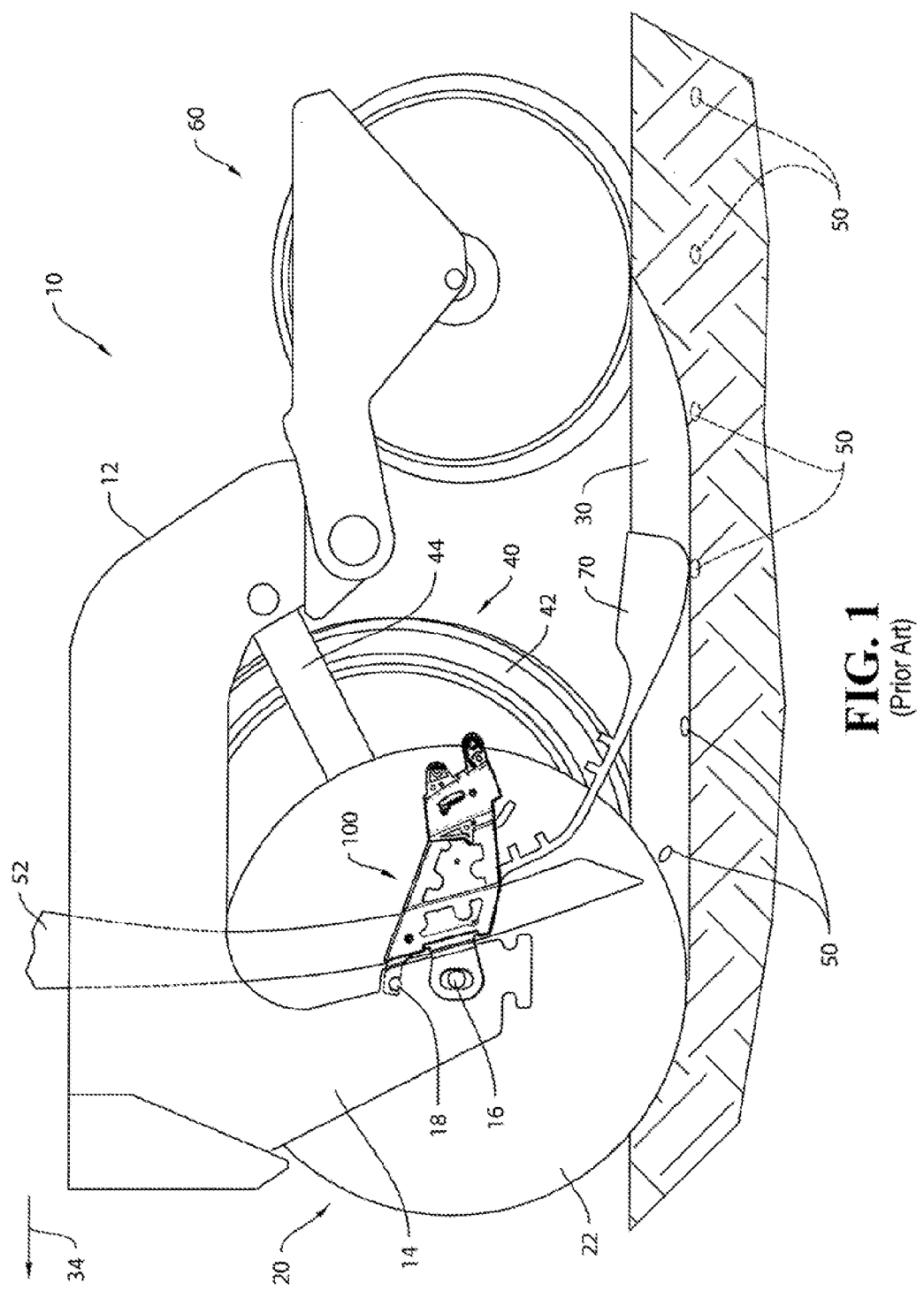
FIG. 1 is a side elevation view of a planter row unit showing a prior art seed firmer and mounting bracket that is not reversible and may be damaged if the planter is reversed without fully raising the row units above the soil.

Referring to the drawings, wherein like reference numerals designate identical or corresponding parts throughout the several views, FIG. 1 illustrates a row unit 10 of a conventional row planter. The row unit 10 includes a frame 12 supporting an opening disc assembly 20. The opening disc assembly 20 may include a pair of angled opening discs 22 (one of the opening discs 22 has been removed for clarity). The opening discs 22 are rollingly mounted to a downwardly extending shank 14 of the frame 12 and disposed to open a v-shaped seed trench 30 in a soil surface 32 as the row unit advances in a forward direction of travel through a field as indicated by arrow 34. A frog, or shank extension, 15 may be connected to shank 14. The row unit 10 may include a gauge wheel assembly 40 comprising a pair of gauge wheels 42 each pivotally mounted to one side of the frame 12 by a respective gauge wheel arm 44 (one of the pair of gauge wheels 42 and its gauge wheel arm 44 is removed for clarity). As is conventional, a depth adjustment assembly (not shown) may be provided to contact the gauge wheel arms 44 to limit the upward travel of the gauge wheel arms 44 with respect to the opening discs 22, thus limiting the depth of the seed trench 30 opened by the opening disc assembly 20. Also as is convention, the row unit 10 may support a seed meter (not shown) and a seed hopper (not shown). In operation, seeds 50 are communicated from the seed hopper to the seed meter. The seed meter singulates the seeds 50 and discharges the singulated seeds into a seed tube 52 supported by the frame 14. Rather than a seed tube, a seed conveyor (not shown) may receive the seeds discharged by the seed meter. The seed meter may be a vacuum-type meter such as that disclosed in International Patent Publication No. WO2012/129442. The seed tube 52 (or seed conveyor) directs the seeds 50 downwardly and rearwardly toward the seed trench 30. The seeds 50 are released the discharge end of the seed tube 52 (or seed conveyor) and are deposited in the open seed trench 30. A closing assembly 60 may be pivotally coupled to the frame 14 and configured to "close" the seed trench 30 by move soil back into the open seed trench 30 over the deposited seeds.

Continuing to refer to FIG. 1, the row unit 10 includes a mounting bracket 100 which supports a seed firmer 70. An example of a mounting bracket 100 is Part No. 150111 available from Precision Planting LLC, 23207 Townline Road, Tremont, IL 61568. Examples of a seed firmers include the Keeton® seed firmer and the SmartFirmer™, also available from Precision Planting LLC.

Figures 2, 2A:
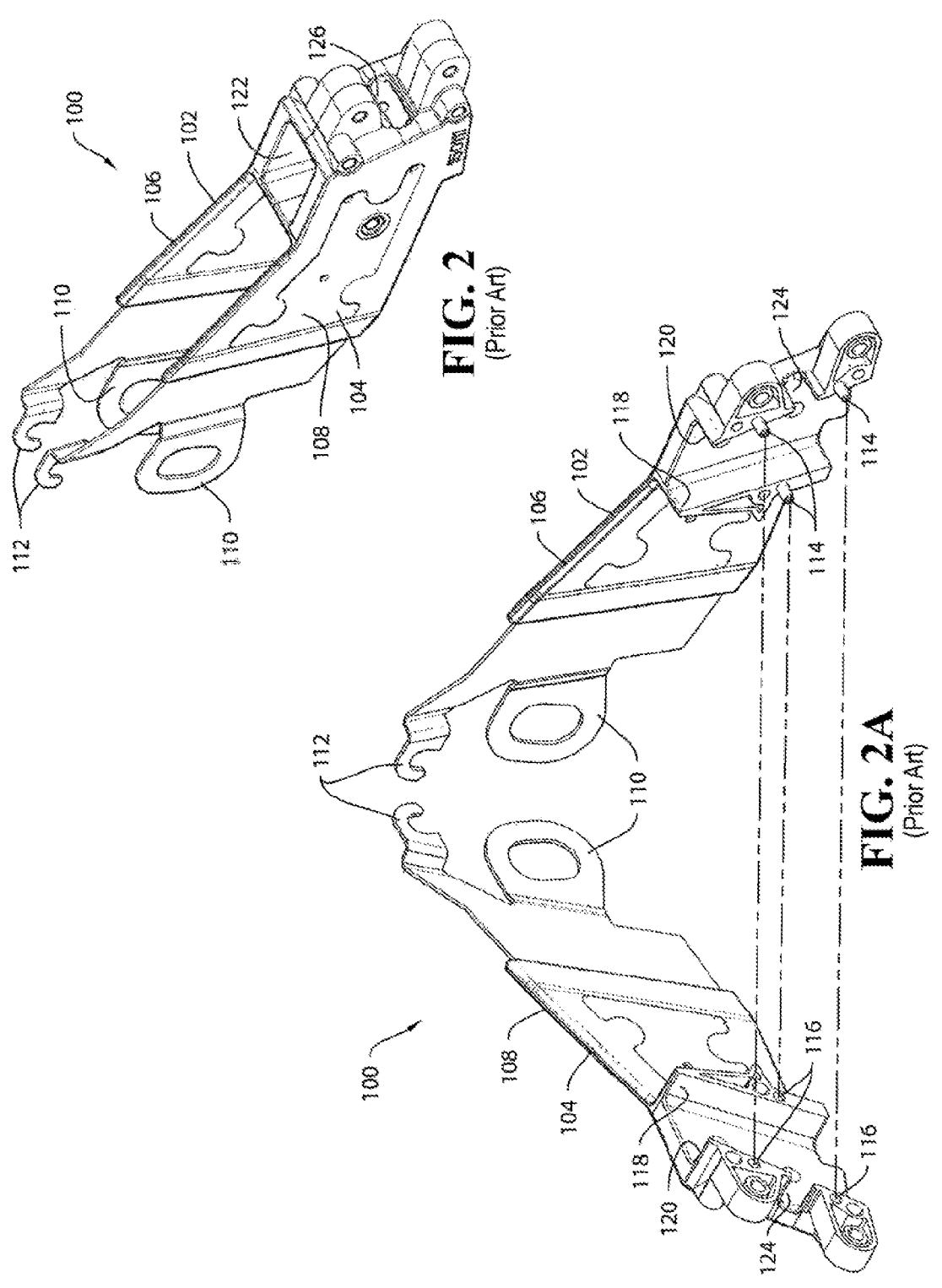
FIG. 2 is a rear perspective view of the prior art mounting bracket shown in FIG. 1.
FIG. 2A is an exploded view of the prior art mounting bracket of FIG. 2.

FIG. 2 is an enlarged perspective view of the mounting bracket 100 shown in FIG. 1. The mounting bracket 100 includes left and right mating halves 102, 104 as best seen in the exploded view of FIG. 2A. Each half 102, 104 includes a respective sidewall 106, 108 which extends forwardly. The forward end of each sidewall 106, 108 includes a mounting ear 110 and a hook member 112. The mounting ear 110 is sized to receive a pin 16 (FIG. 1) extending from each side of the shank 14 of the frame 12. The hook member 112 also engages with a pin 18 (FIG. 1) on the shank 18. It should be appreciated that the engagement of the mounting ear 110 and hook member 112 with the respective pins 16, 18 on the shank 14 rigidly secure the mounting bracket 100 with respect to the shank 14. The rearward ends of each half 102, 104 are secured together by pegs 114 received within matingly aligned apertures 116. As shown in FIGS. 2 and 2A, each half 102, 104 also includes inwardly projecting, longitudinally spaced forward and rearward flanges 118, 120 which matingly align, such that when assembled, the mating flanges 118, 120 define a through-opening 122 (FIG. 2) for receiving the upper portion of the firmer 70 as best illustrated in FIG. 3. Each of the rearward flanges 120 includes a slotted portion 124, which together define a transverse slot 126 when the halves 102, 104 are assembled. As discussed later, the transverse slot 126 receives the rearwardly projecting tab 80 of the resilient arm 78 of the seed firmer 70 while the bottom end of the forward flange 118 engages with the forwardly extending lip 82 on the firmer 70. The inwardly projecting flanges 118, 120 also serve as spacers between the sidewalls 106, 108 for receiving the seed tube 52 (or seed conveyor) therebetween as shown in FIG. 1. Thus the sidewalls 106, 108 surround the seed tube 52 (or seed conveyor) permitting independent movement of the seed tube 52 (or seed conveyor) with respect to the mounting bracket 100.

Figures 3A, 3B:
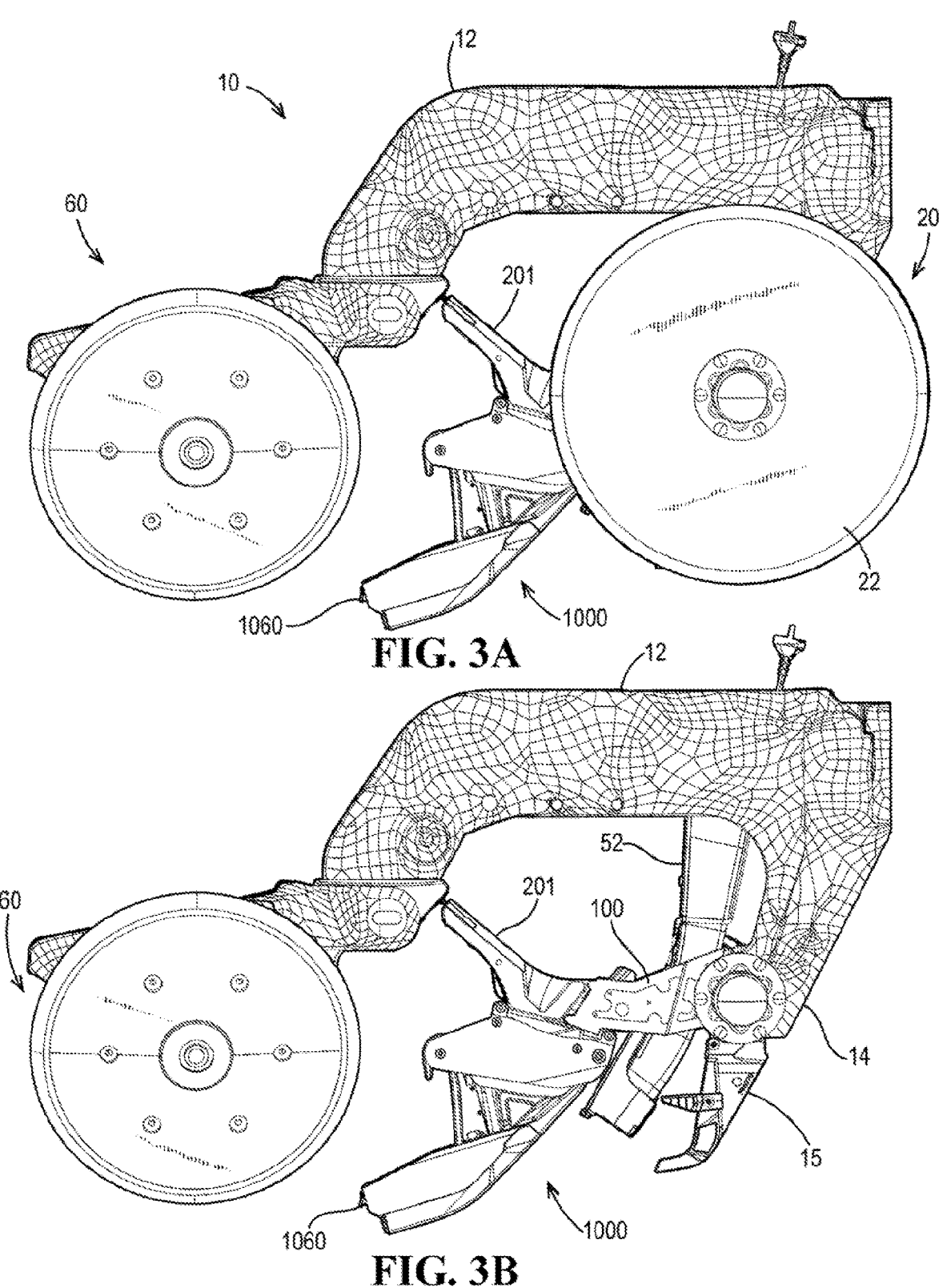
FIG. 3A is a side elevation view of a planter row unit showing the reversible seed trench appurtenance.
FIG. 3B is a side elevation view of the planter row unit of FIG. 3A with the opening discs removed for viewing.
Figures 4, 5:
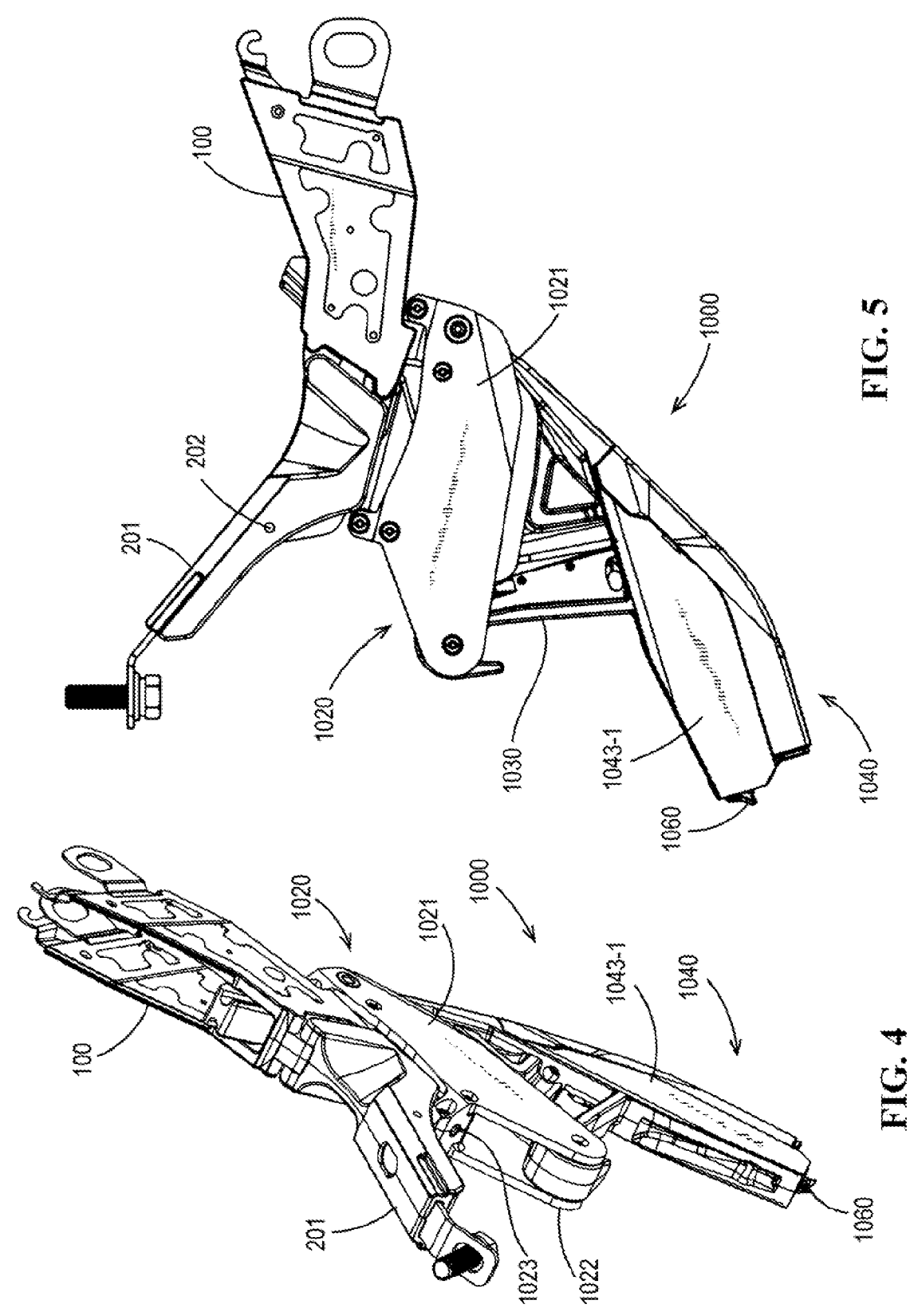
FIG. 4 is a perspective view of the reversible seed trench appurtenance with the mounting bracket and support bracket.
FIG. 5 is a right side elevation view of the seed trench appurtenance of FIG. 4.
Figures 6, 7:
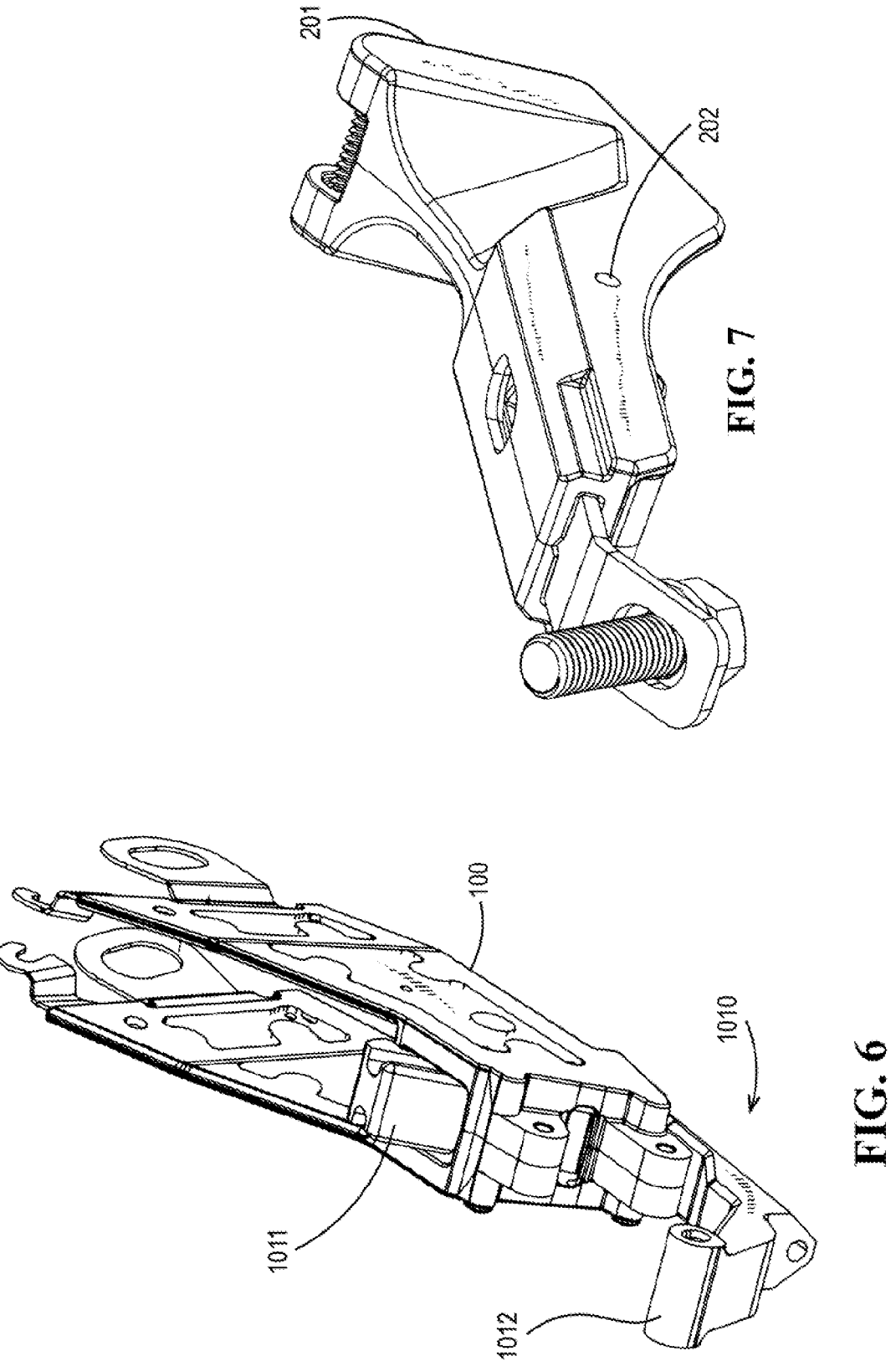
FIG. 6 is a perspective view of the mounting bracket and mounting frame.
FIG. 7 is a perspective view of the support bracket of FIG. 4.
Figures 8, 9, 10, 11:
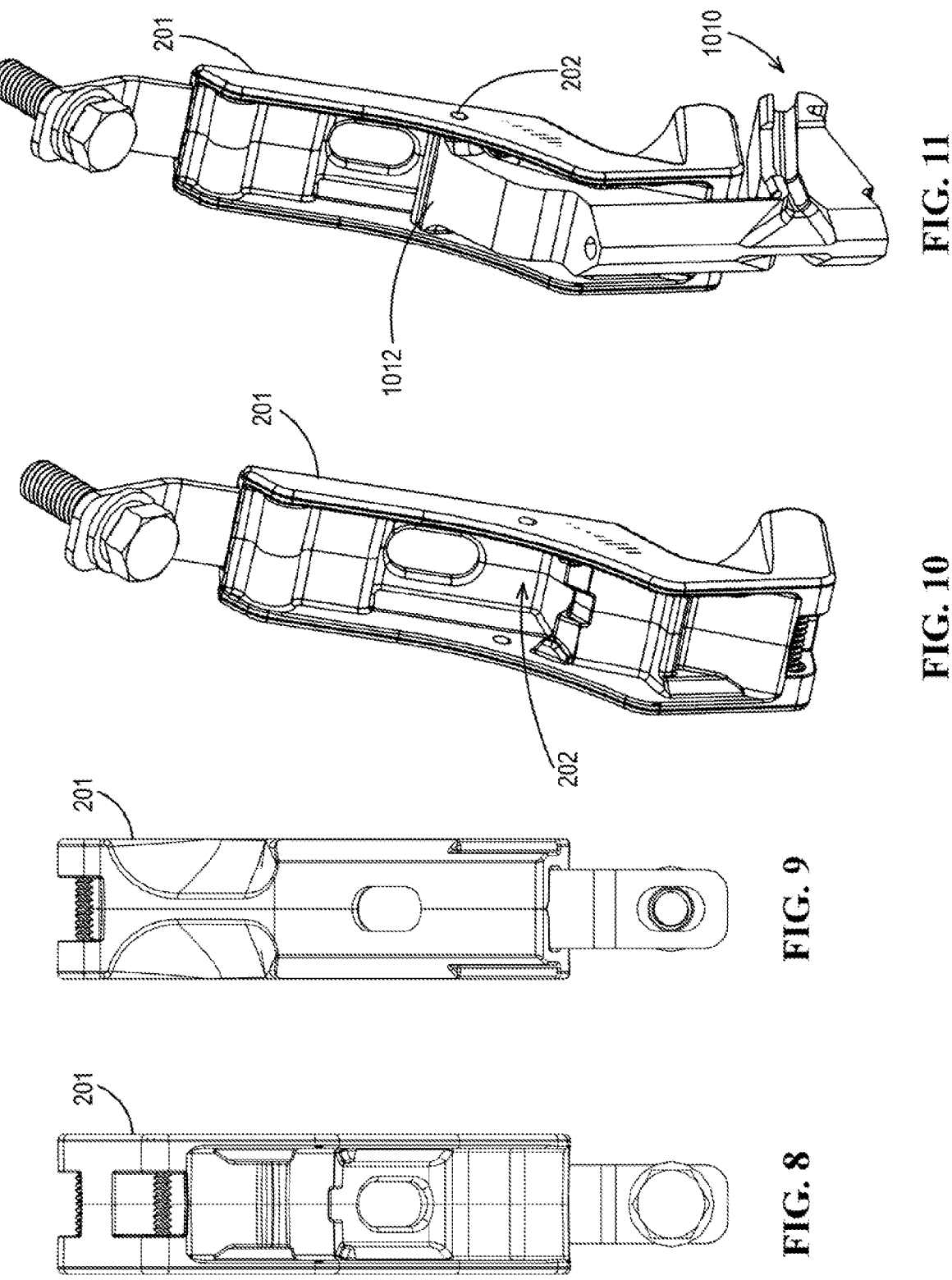
FIG. 8 is a bottom plan view of the support bracket of FIG. 7.
FIG. 9 is a top plan view of the support bracket of FIG. 7.
FIG. 10 is a bottom perspective view of the support bracket of FIG. 7.
FIG. 11 is a bottom perspective view of the support bracket of FIG. 7 with the mounting frame.

Referring to FIGS. 3A and 3B, reversible seed trench appurtenance is shown mounted to row unit 10 using mounting bracket 100 and support bracket 201. Support bracket 201 is the FurrowJet support bracket from Precision Planting LLC and available as Part No. 141130, 141150, 141131, 141137, 141133, 141134, 141135, or 141214 depending on the type of row unit. An example of a support bracket is rearward bracket 7310 illustrated in FIG. 44 of PCT Publication No. WO2016205424. Support bracket 201 for a John Deere ME2, ME Plus, ME XP, or ME5 row unit is illustrated in FIGS. 7 to 10. Support bracket 201 connects reversible seed trench appurtenance 1000 to row unit 10 proximate closing assembly 60. FIGS. 4 and 5 show the reversible seed trench appurtenance 1000 connected to mounting bracket 100 and support bracket 201. FIG. 6 is a perspective view of mounting frame 1010 engaged with mounting bracket 100 via notch 1018 on arm 1011 on mounting frame 1010 and flange 118 on mounting bracket 100. FIG. 11 is a bottom perspective view of mounting frame 1010 connected to support bracket 201 at connection 202 via connection 1012. The connection be by a pin (not shown here but described below).

Reversible seed trench appurtenance 1000 has a mounting frame 1010 connected to frame 1020. Frame 1020 has first and second sides 1021 and 1022. Frame 1020 is illustrated in FIGS. 27-30. Mounting frame 1010 has connections 1013 and 1014 for connecting to connections 1023 and 1024, respectively, on frame 1020. Frame 1020 has a post 1025 formed by first post portion 1025-1 on first side 1021 and second post portion 1025-2 on second side 1022. Frame 1020 has connection 1026 formed from first connection portion 1026-1 and second connection portion 1026-2 on first side 1021 and second side 1022, respectively. Optionally, second connection 1027 can be formed from first connection portion 1027-1 and second connection portion 1027-2 on first side 1021 and second side 1022, respectively.

Figures 12, 13:
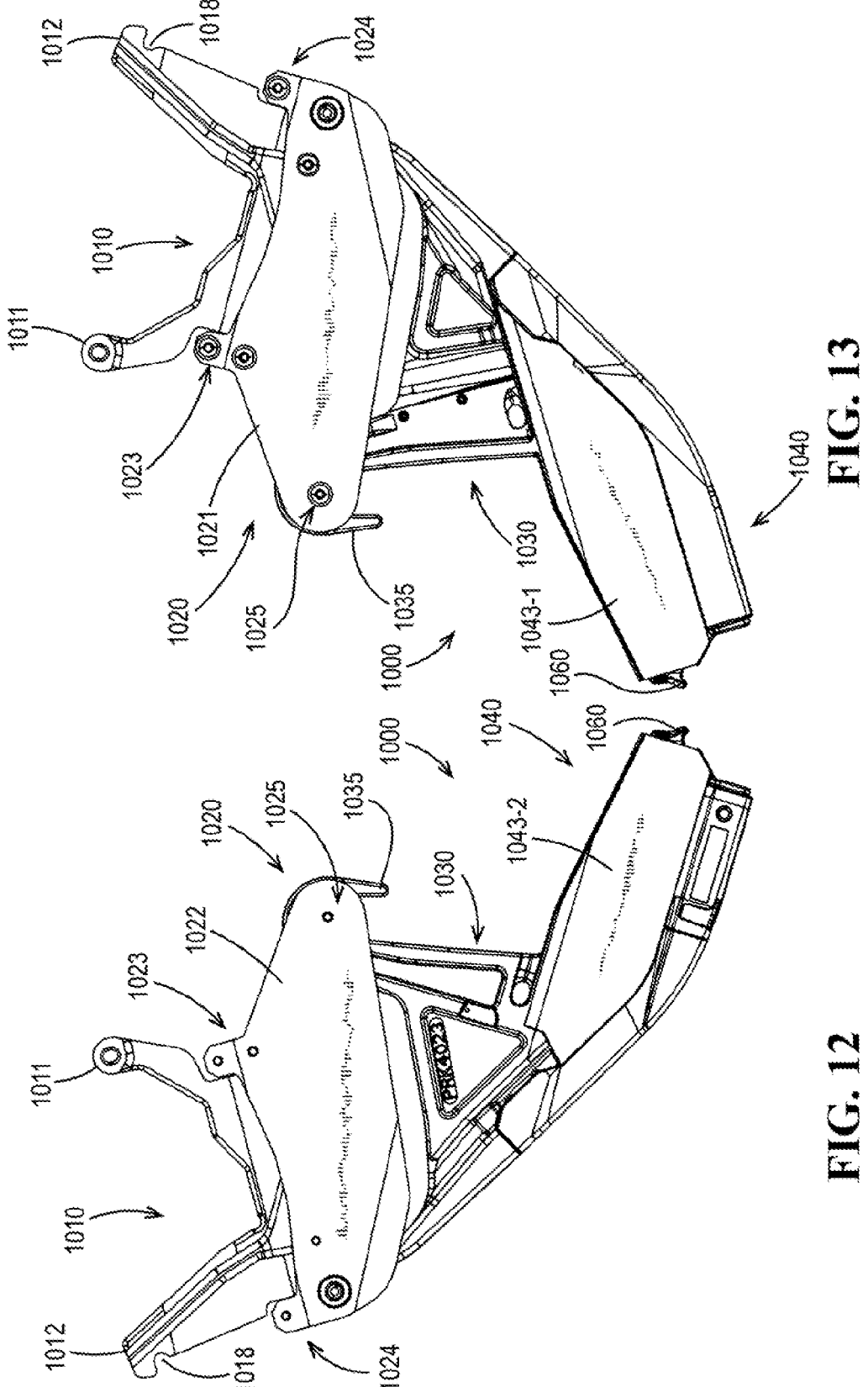
FIG. 12 is a left side elevation view of the reversible seed trench appurtenance of FIG. 4.
FIG. 13 is a right side elevation view of the reversible seed trench appurtenance of FIG. 4.
Figure 14:
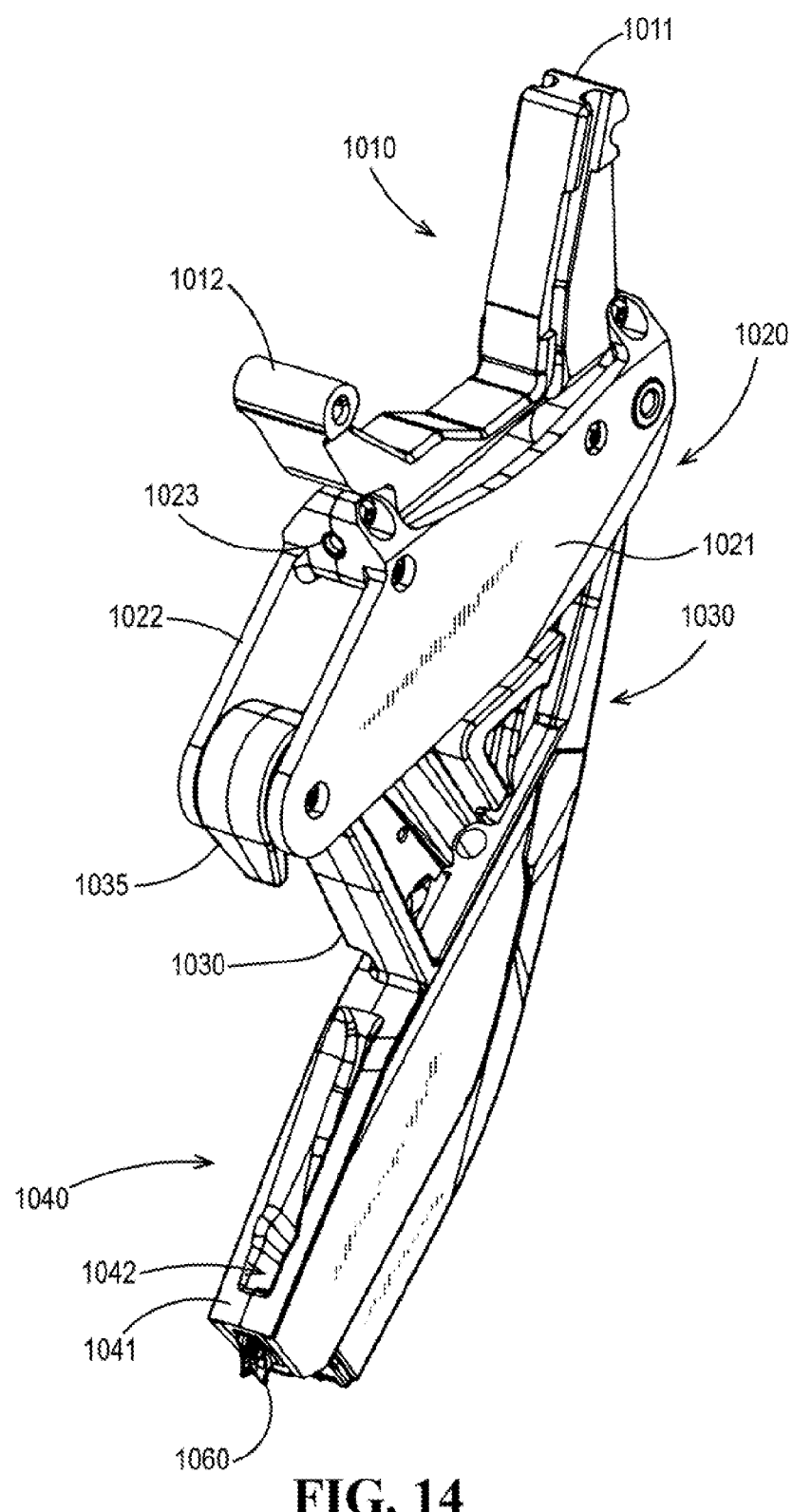
FIG. 14 is a perspective view of the reversible seed trench appurtenance of FIG. 4.
Figures 15, 16, 17, 18:
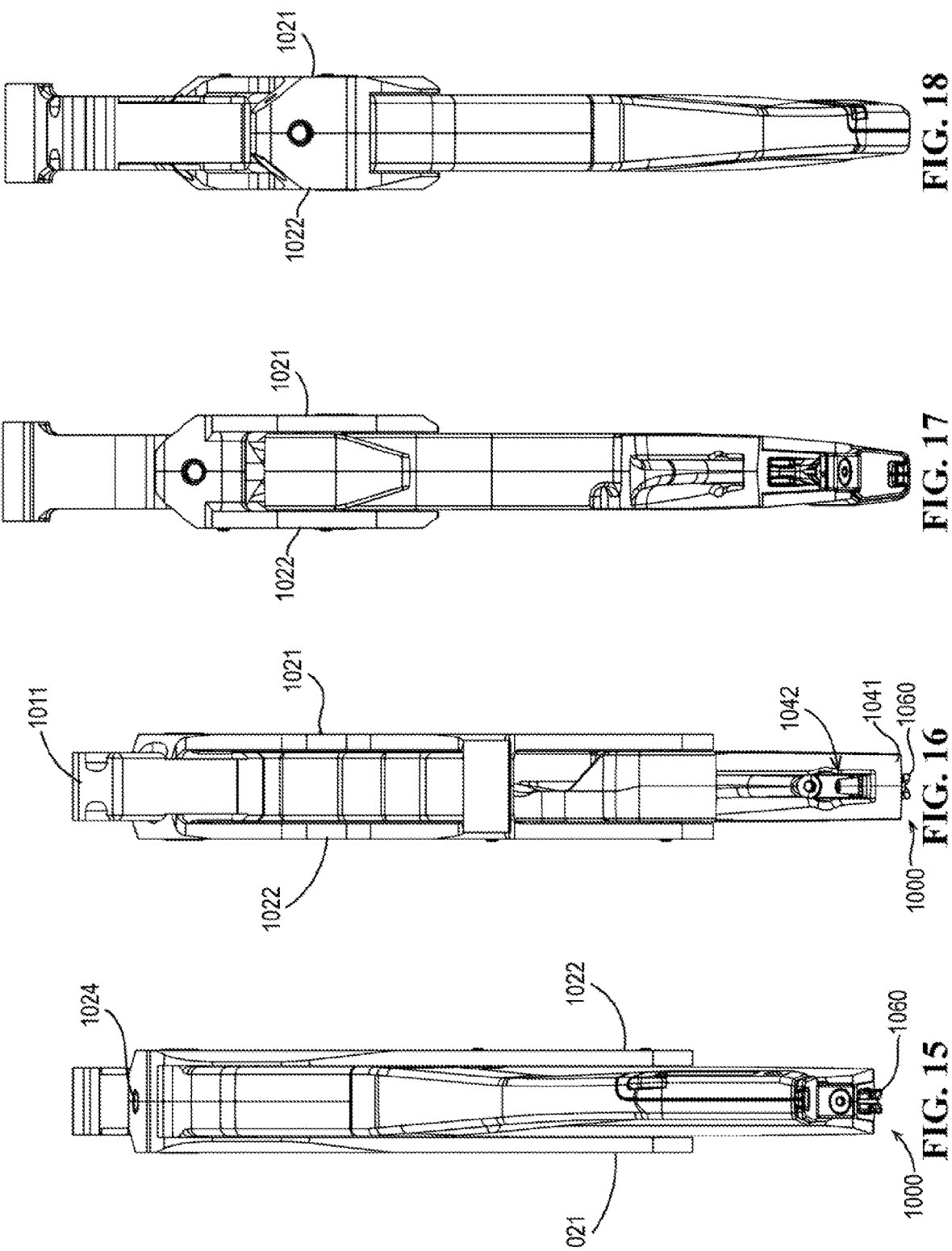
FIG. 15 is a bottom plan view of the reversible seed trench appurtenance of FIG. 4.
FIG. 16 is a top plan view of the reversible seed trench appurtenance of FIG. 4.
FIG. 17 is a rear elevation view of the reversible seed trench appurtenance of FIG. 4.
FIG. 18 is a front elevation view of the reversible seed trench appurtenance of FIG. 4.
Figures 19, 20, 21:
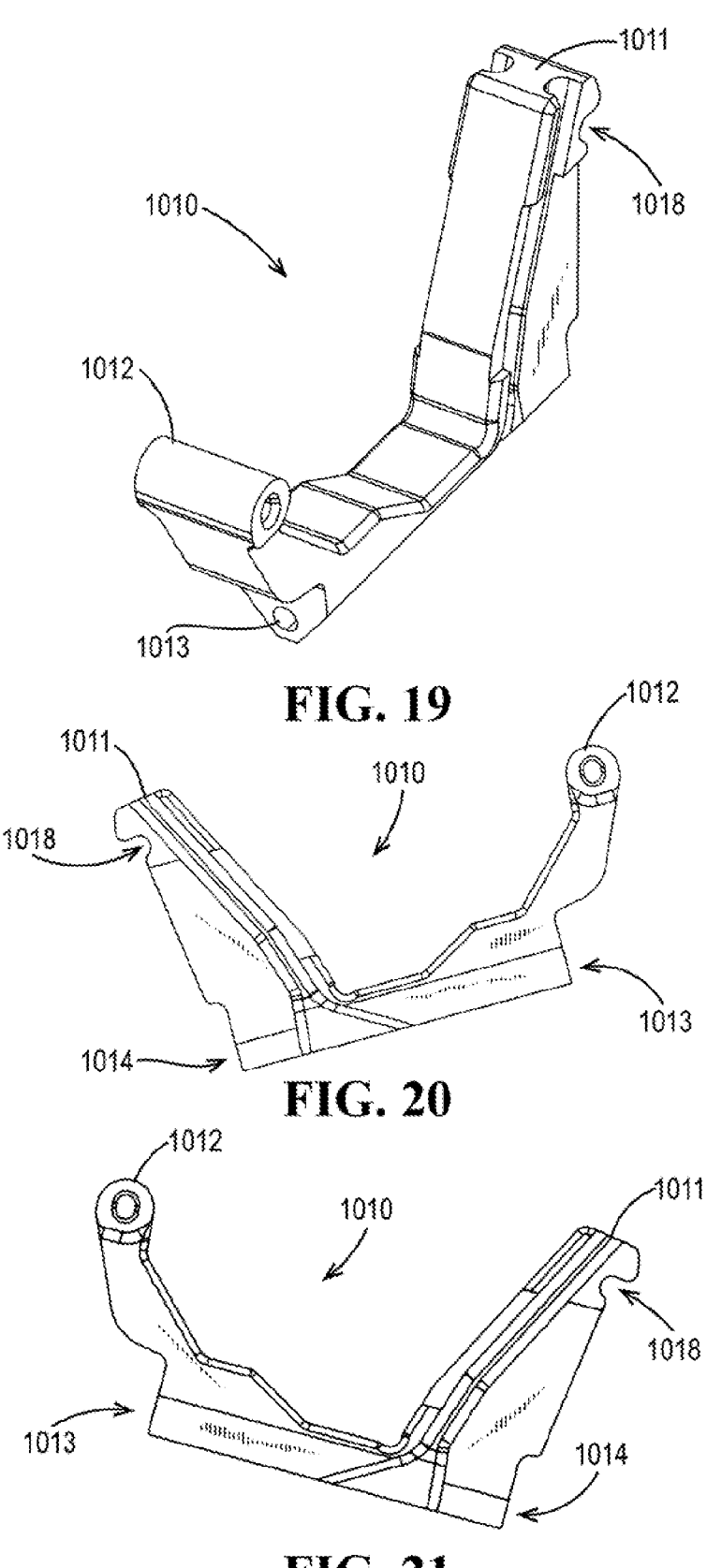
FIG. 19 is a perspective view of the mounting frame of the reversible seed trench appurtenance of FIG. 4.
FIG. 20 is a left side elevation view of the mounting frame of FIG. 19.
FIG. 21 is a right side elevation view of the mounting frame of FIG. 19.
Figures 27, 28, 29, 30:
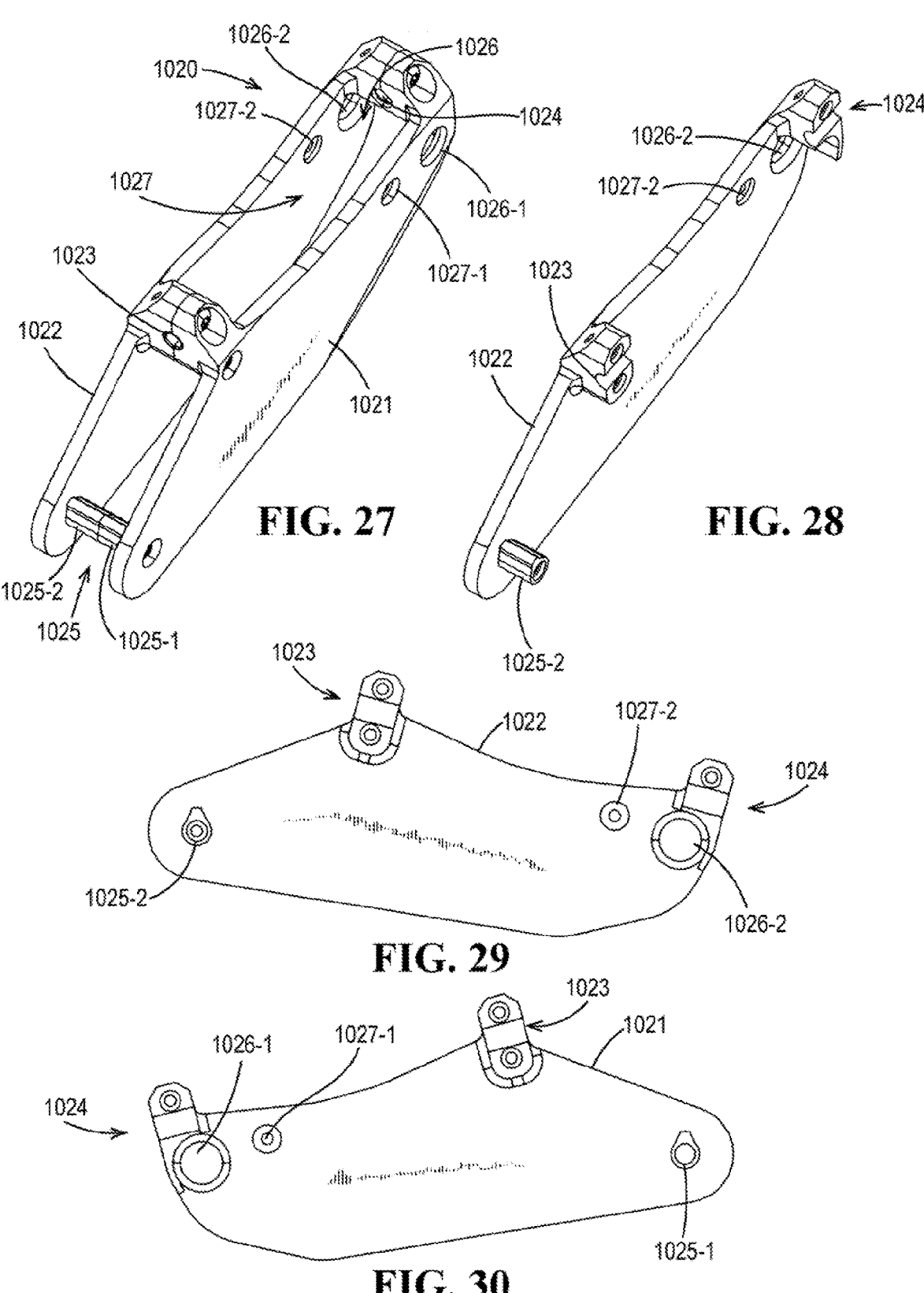
FIG. 27 is a perspective view of the frame of the reversible seed trench appurtenance of FIG. 4.
FIG. 28 is a perspective view of the second plate of the frame of FIG. 27.
FIG. 29 is a right side elevation view of the second plate of FIG. 28.
FIG. 30 is a left side elevation view of the first plate of the frame of FIG. 27.
Figures 31, 32:
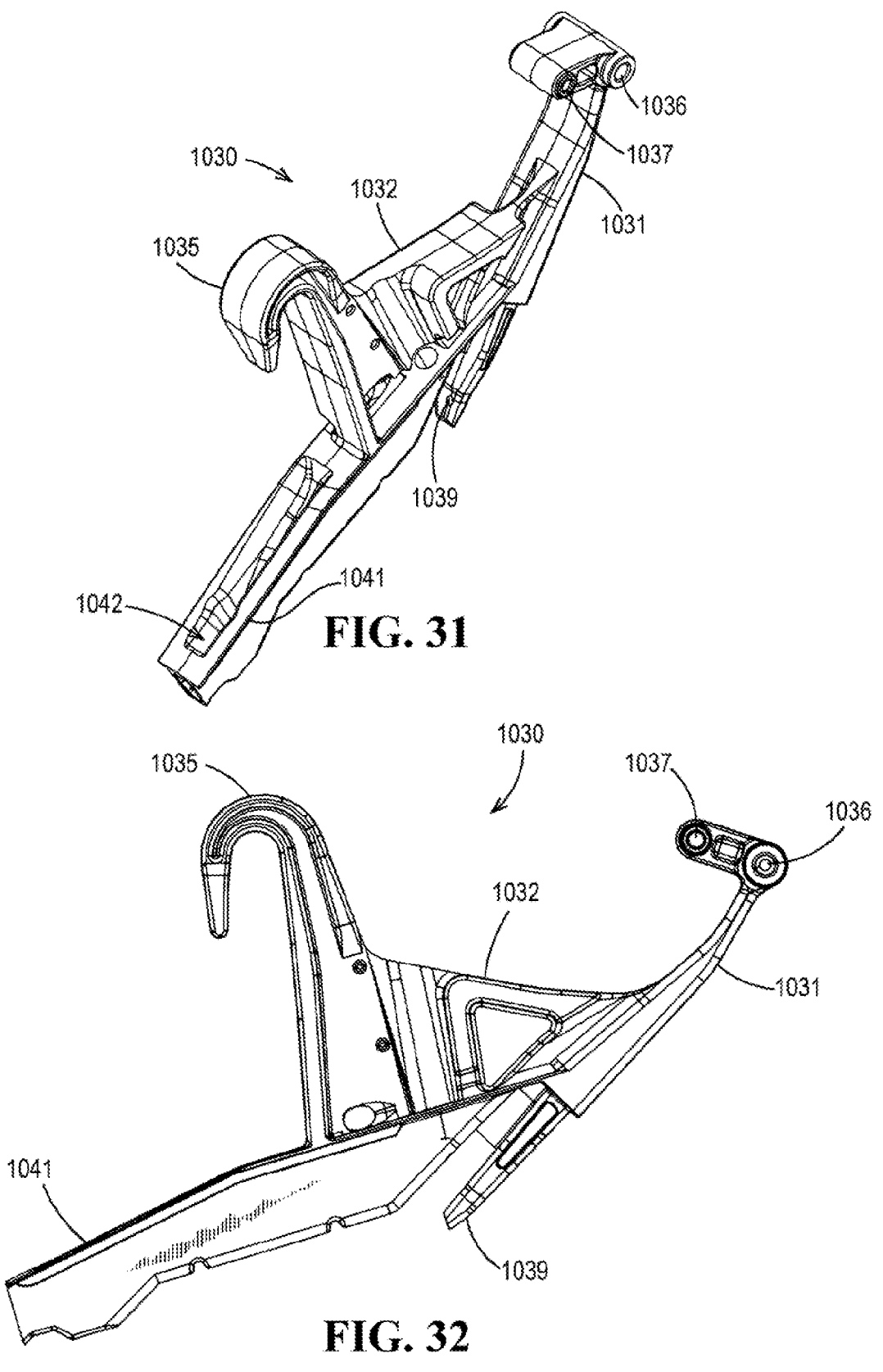
FIG. 31 is perspective view of the neck body of the reversible seed trench appurtenance of FIG. 4.
FIG. 32 is a right side elevation view of the neck body of FIG. 31.
Figure 33:
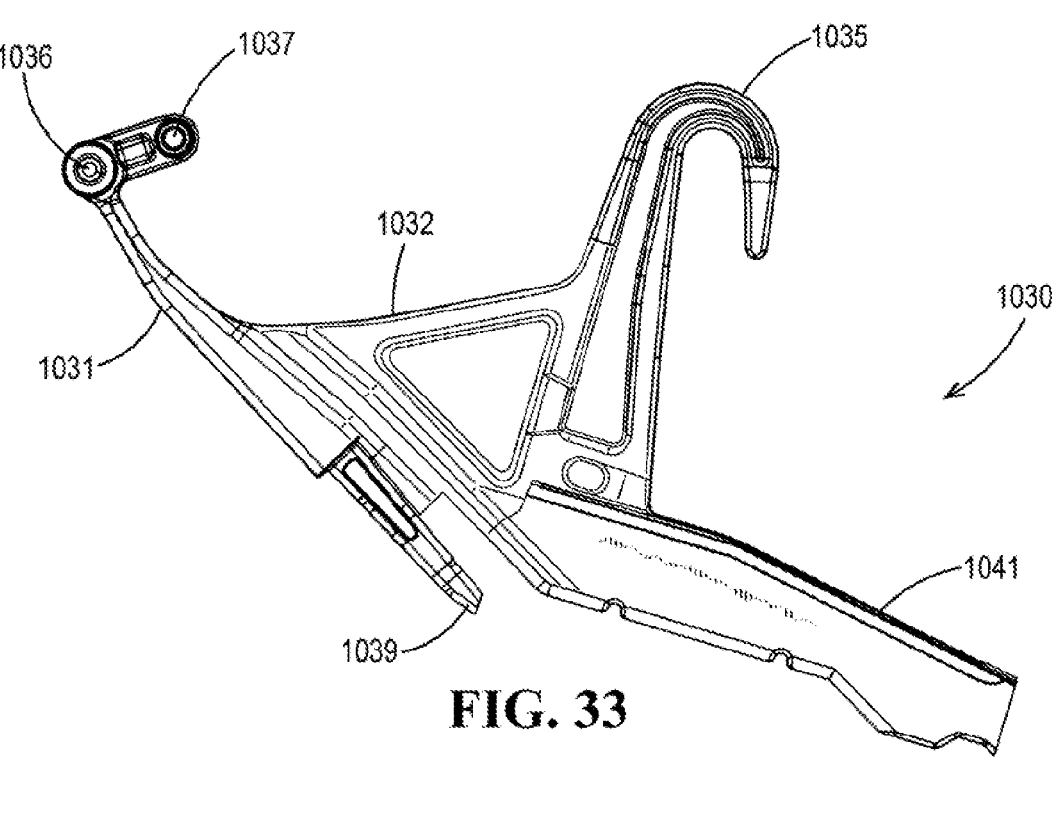
FIG. 33 is a left side elevation view of the neck body of FIG. 31.
Figure 34:
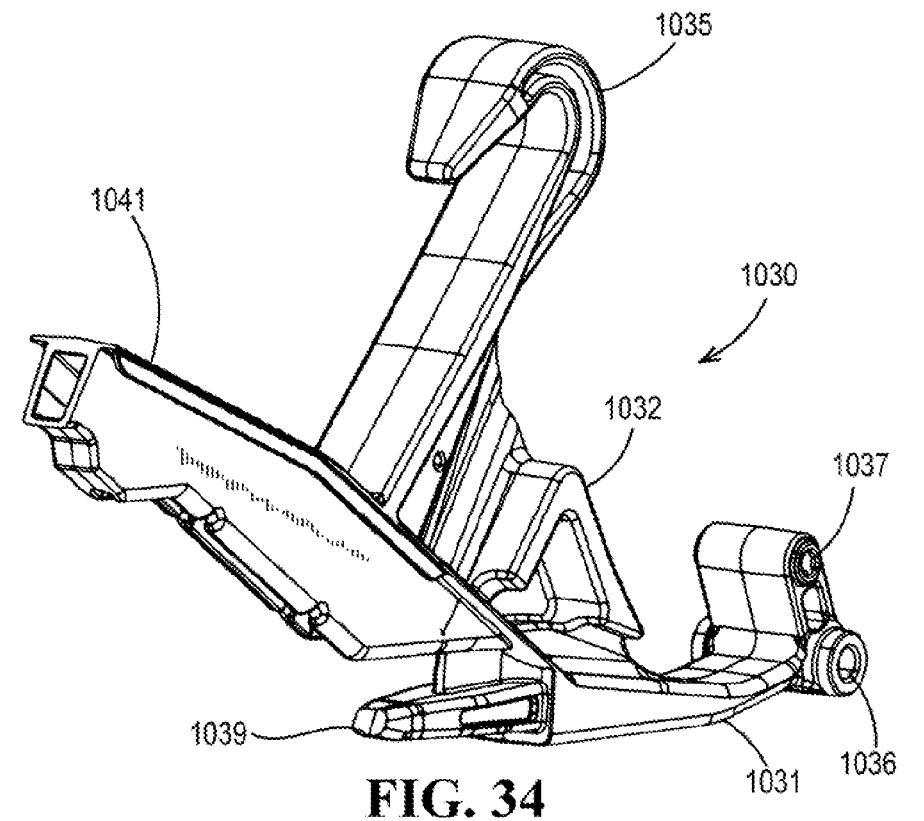
FIG. 34 is a bottom perspective view of the neck body of FIG. 31.
Figures 35, 36, 37, 38:
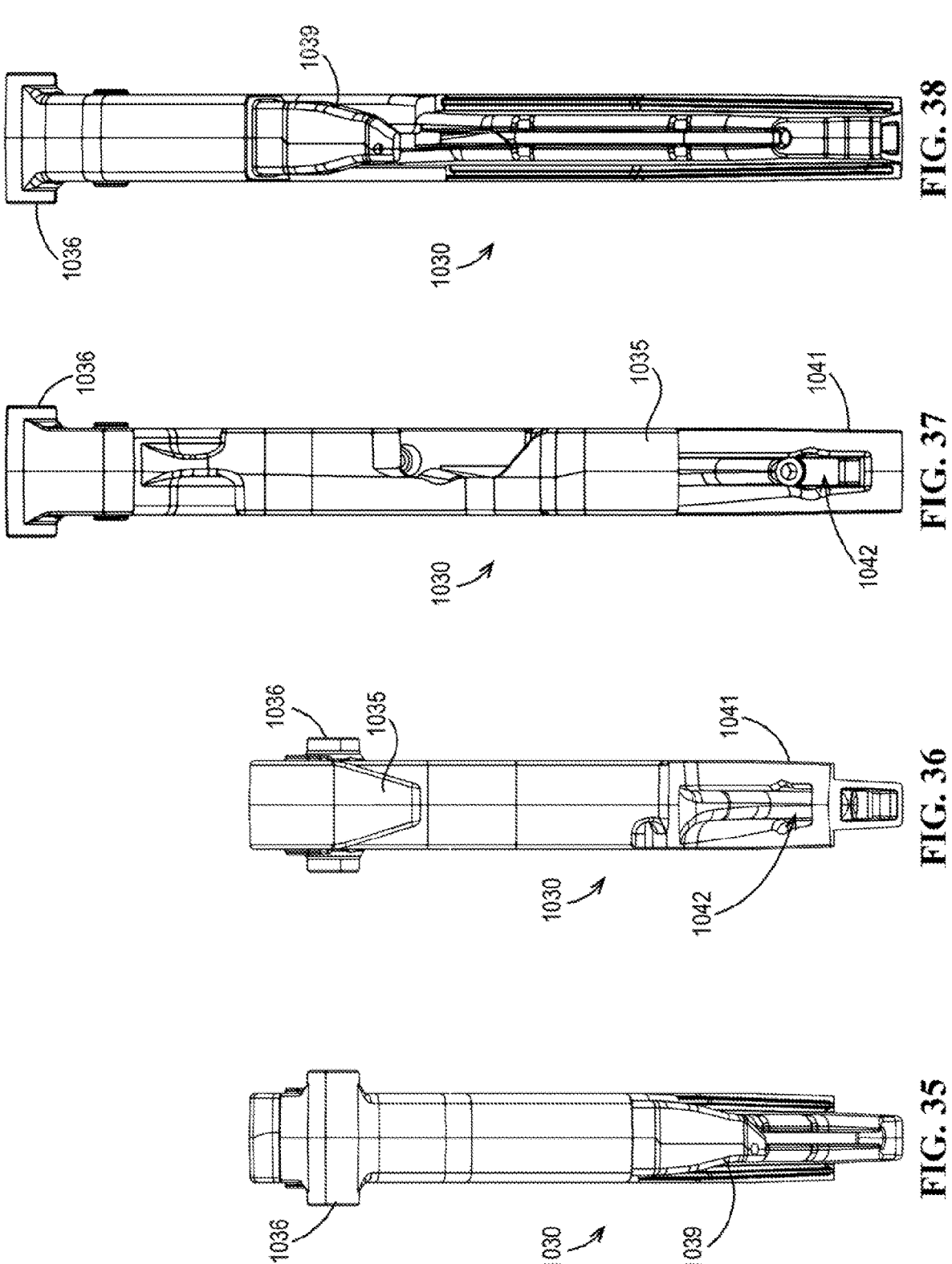
FIG. 35 is a front elevation view of the neck body of FIG. 31.
FIG. 36 is a rear elevation view of the neck body of FIG. 31.
FIG. 37 is a top plan view of the neck body of FIG. 31.
FIG. 38 is a bottom plan view of the neck body of FIG. 31.
Figure 41:
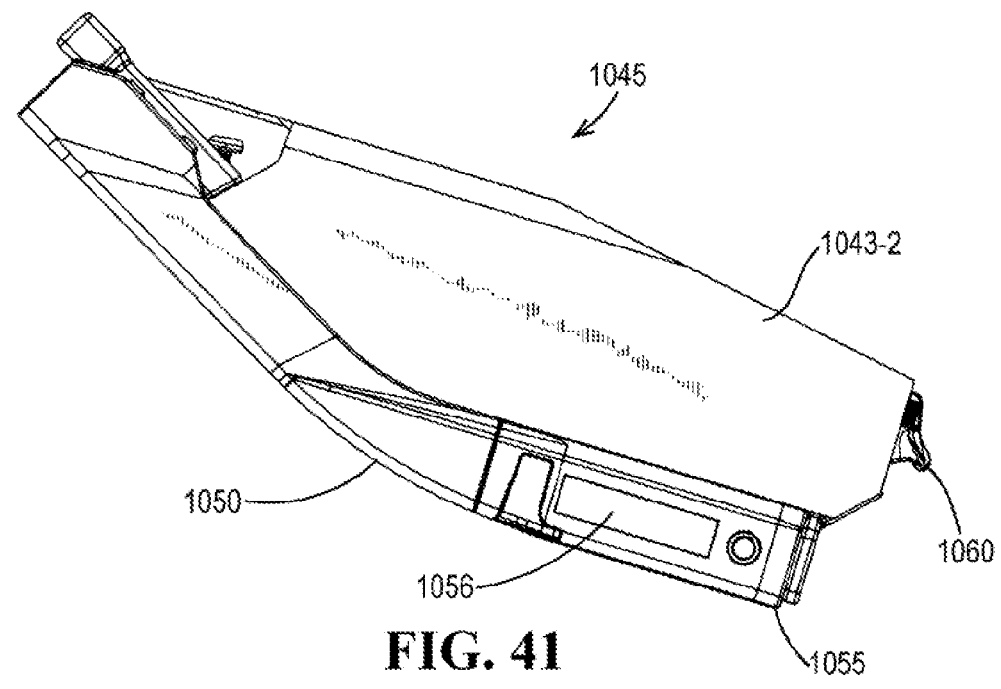
FIG. 41 is a left side elevation view of the lower tail of FIG. 39.
Figure 42:
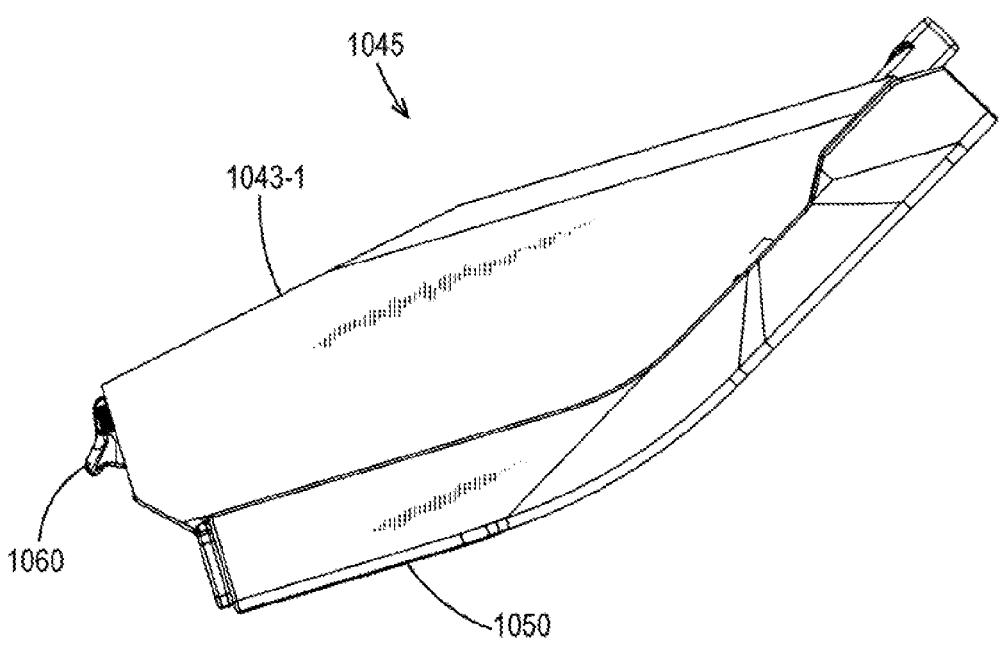
FIG. 42 is a right side elevation view of the lower tail of FIG. 39.
Figure 45:
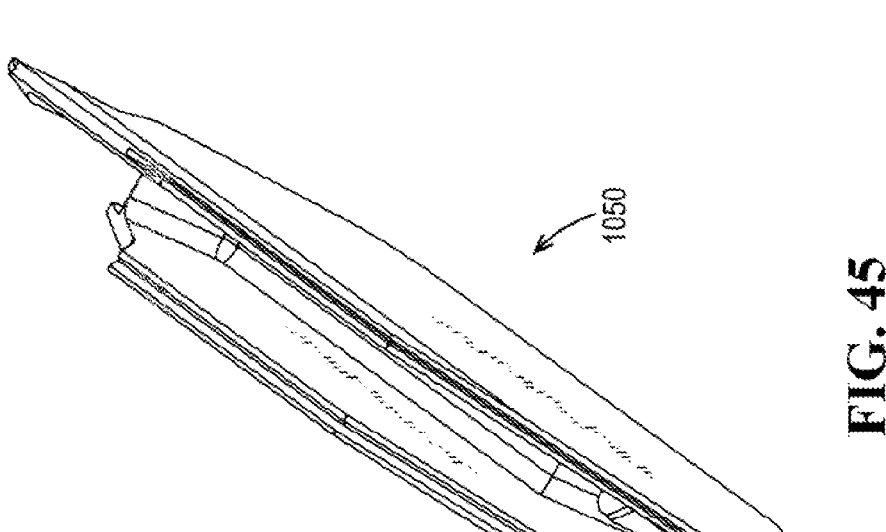
FIG. 45 is a perspective view of the cover of the lower tail of FIG. 39.
Figure 45:
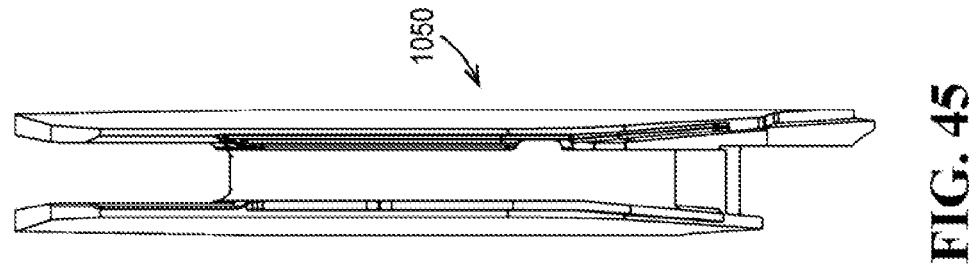
Figure 43:
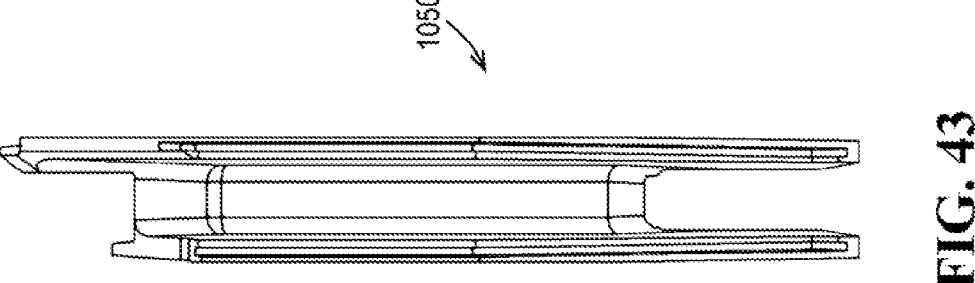
FIG. 43 is a top plan view of the cover of the lower tail of FIG. 39.
Figures 46, 47, 48:
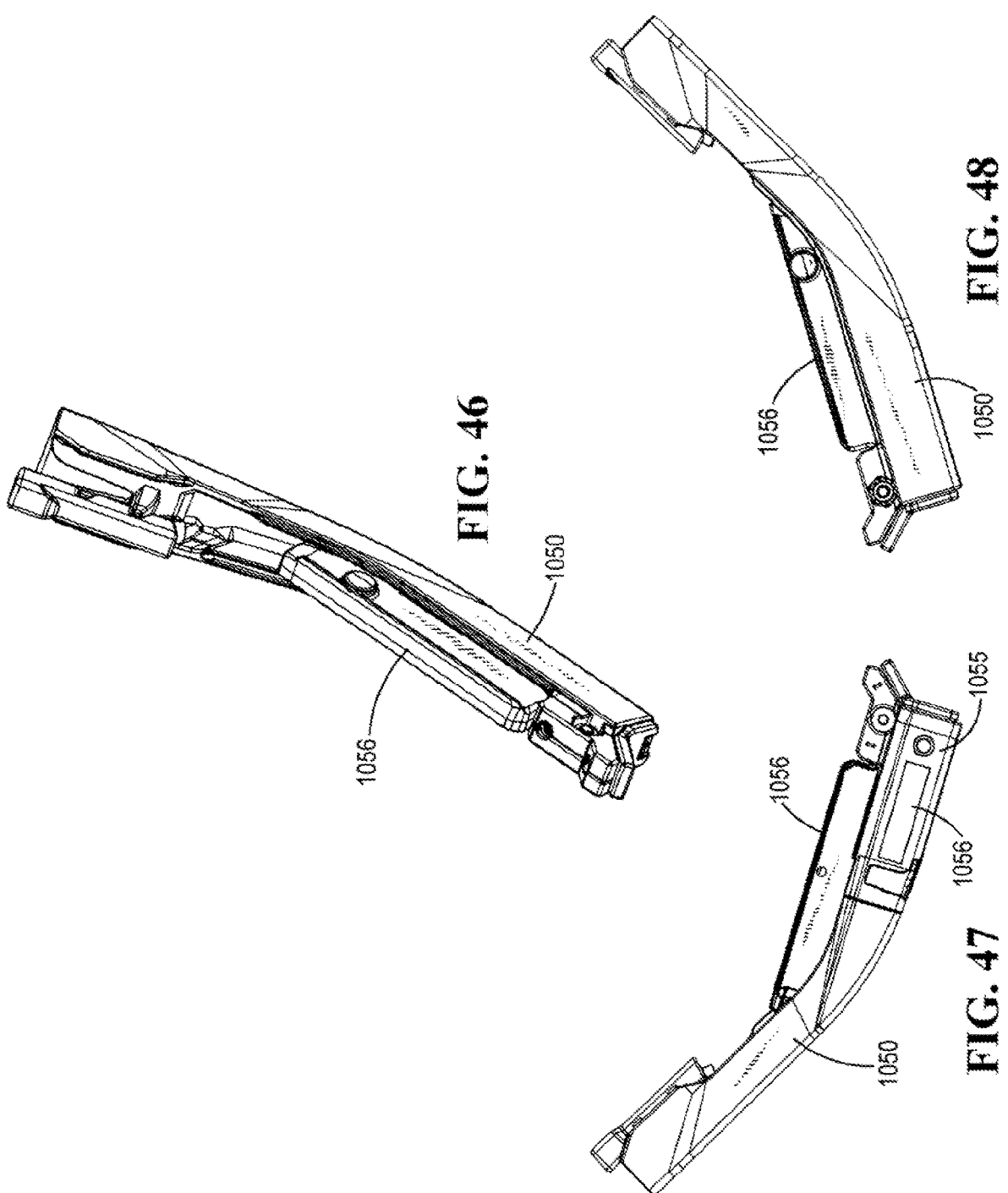
FIG. 46 is a perspective view of the tail body with electronic components of the tail of FIG. 39.
FIG. 47 is a left side elevation view of the tail body with electronic components of FIG. 46.
FIG. 48 is a right side elevation view of the tail body with electronic components of FIG. 46.
Figures 49, 50:
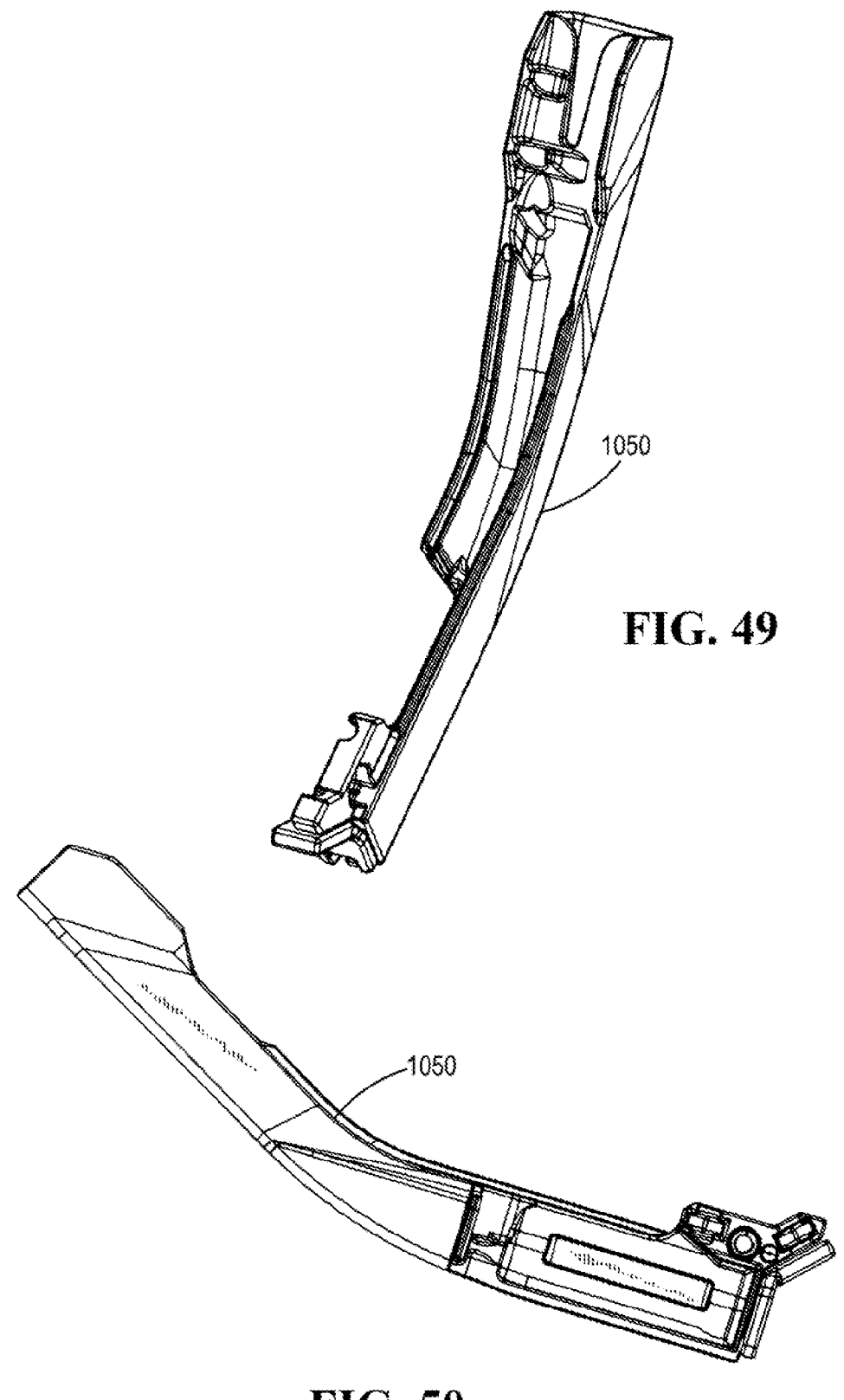
FIG. 49 is a perspective view of the tail body of FIG. 46.
FIG. 50 is a left side elevation view of the tail body of FIG. 49.
Figures 51, 52, 53:
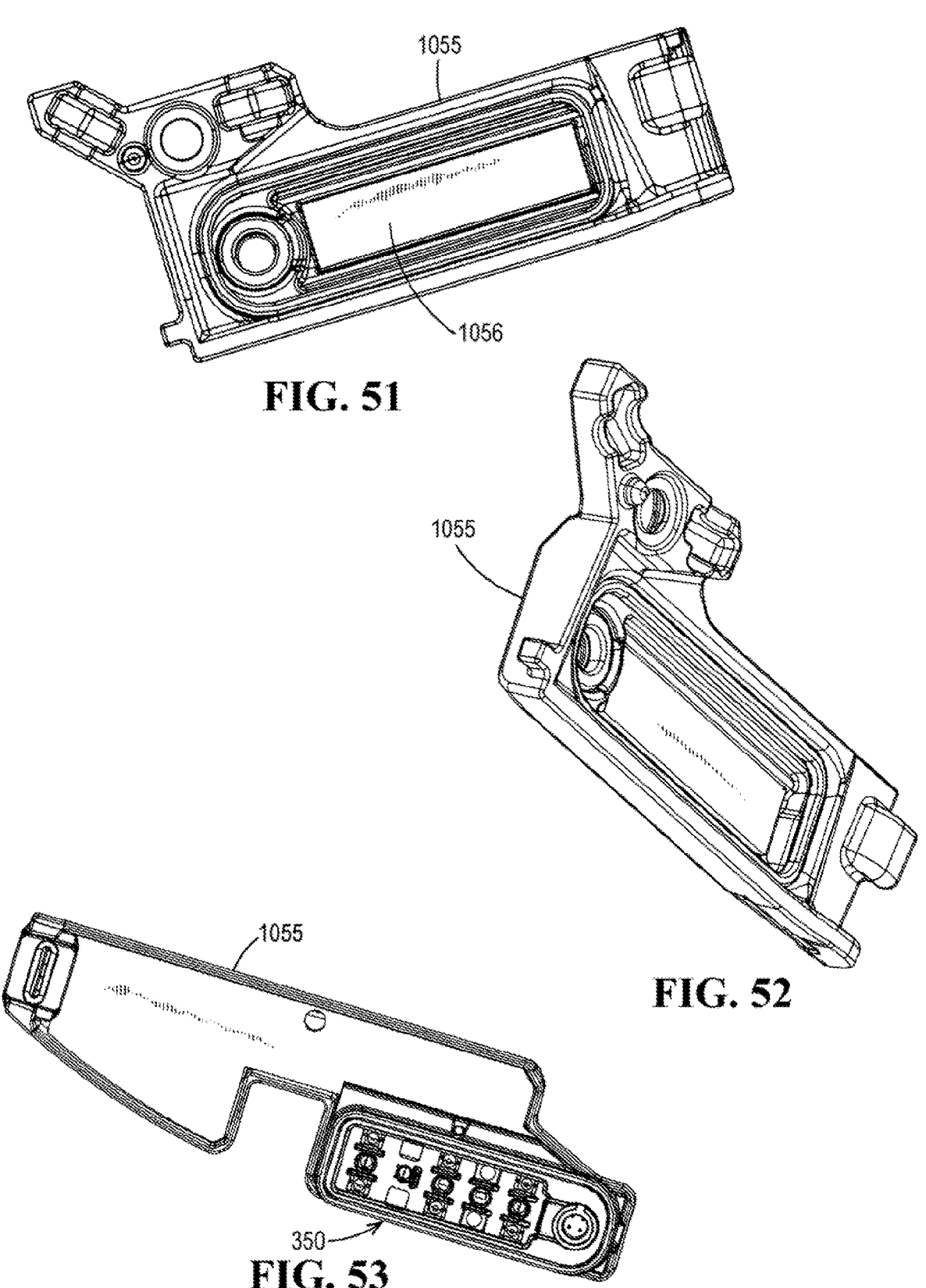
FIG. 51 is a right side elevation view of the window housing of the tail body of FIG. 46.
FIG. 52 is a bottom perspective view of the window housing of FIG. 51.
FIG. 53 is a right side elevation view of the electronics housing of the tail of FIG. 39.
Figure 54:
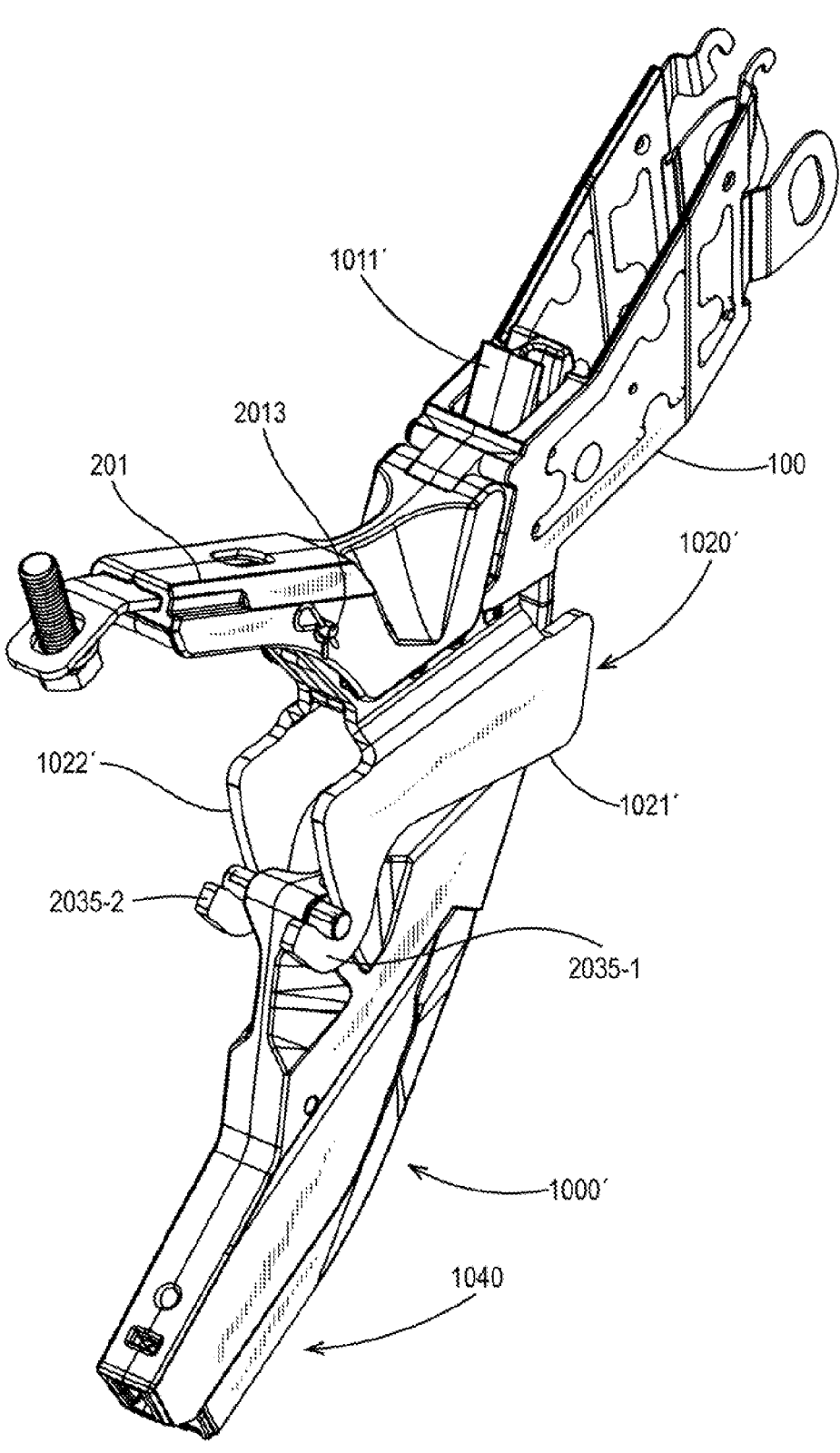
FIG. 54 is a perspective view of another seed trench appurtenance with a mounting bracket and a support bracket.
Figures 55, 56:
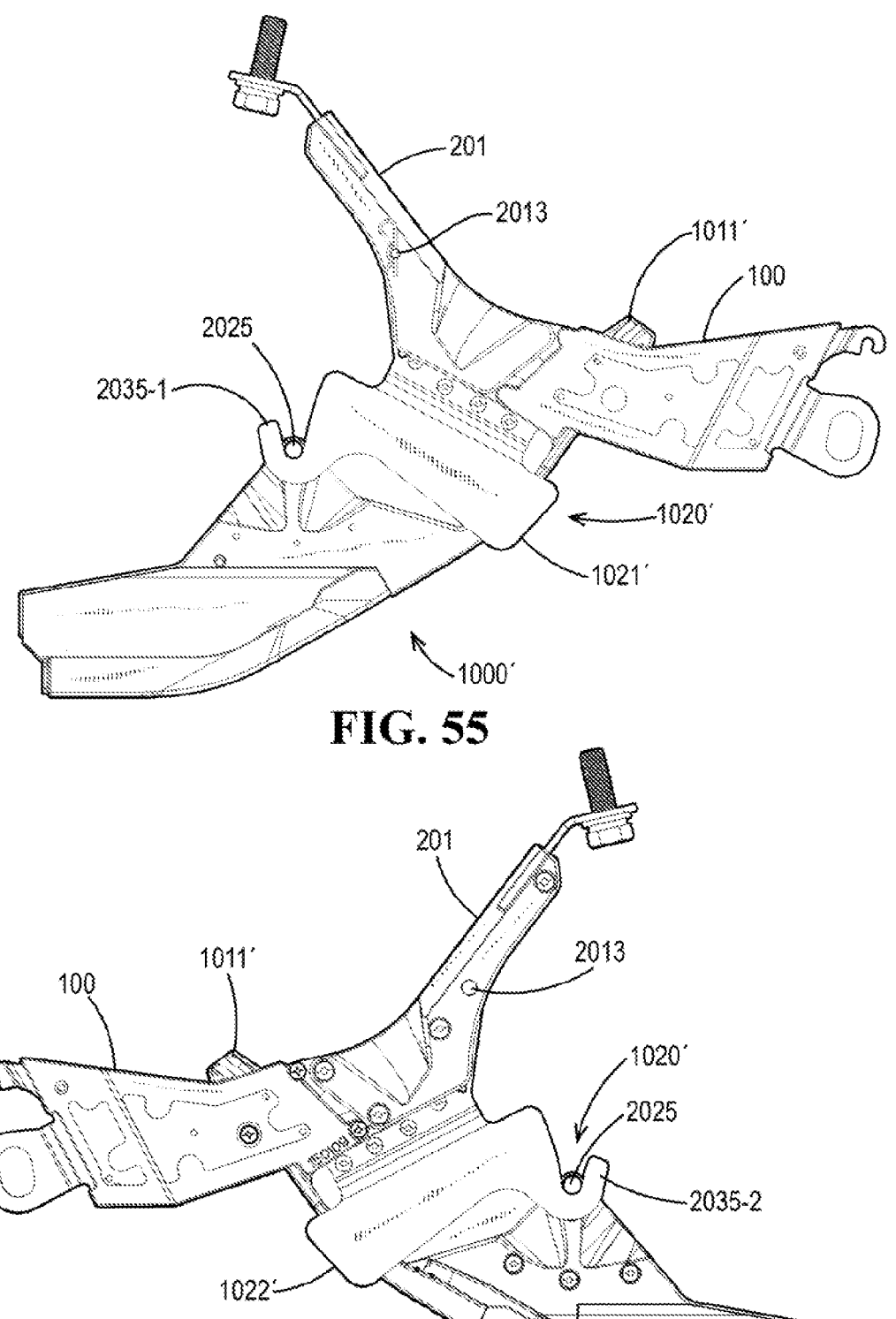
FIG. 55 is a right side elevation view of the seed trench appurtenance of FIG. 54.
FIG. 56 is a left side elevation view of the seed trench appurtenance of FIG. 54.
Figure 61:
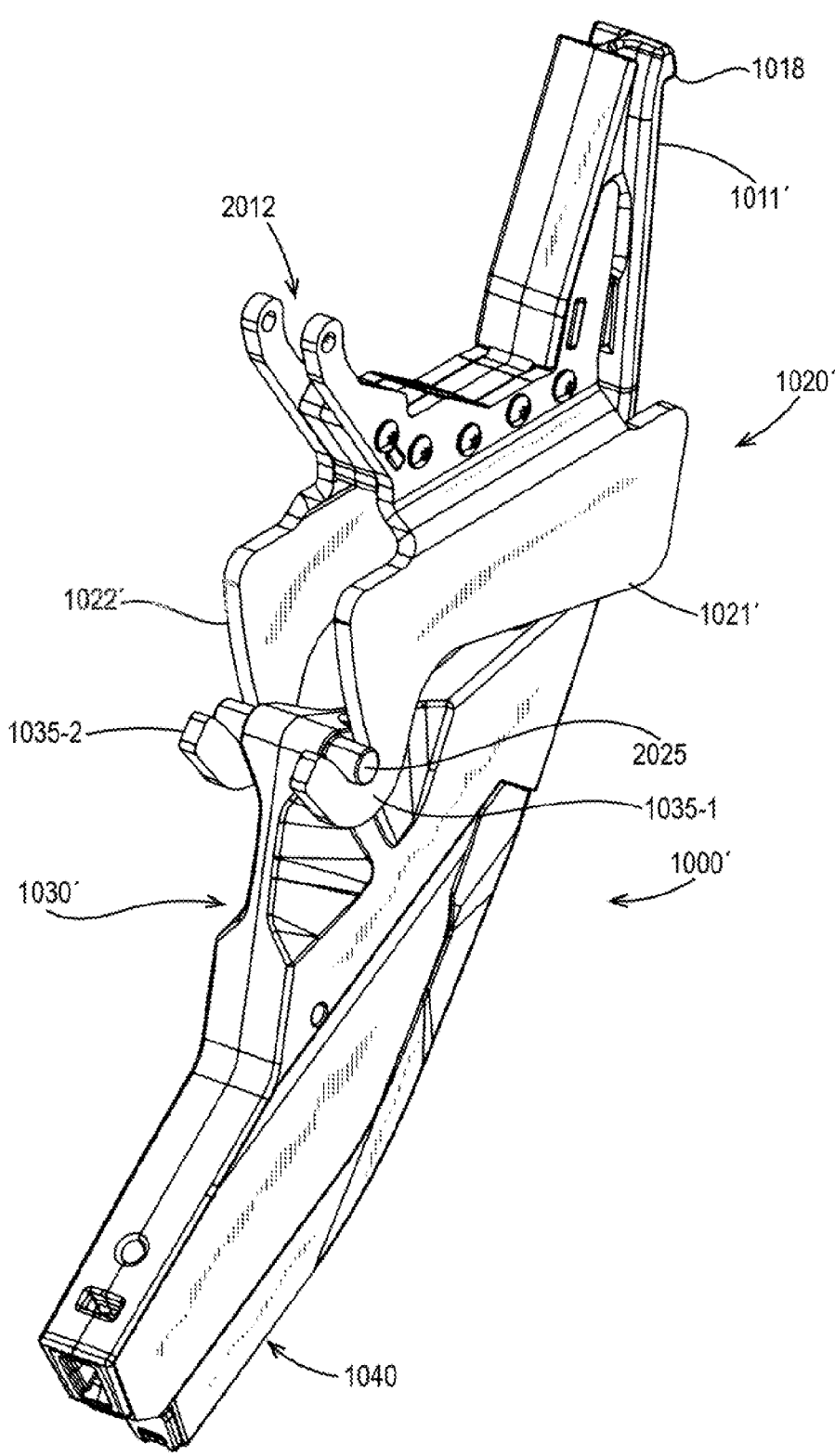
FIG. 61 is a perspective view of the seed trench appurtenance of FIG. 54 with the mounting bracket and support bracket removed for viewing.
Figure 62:
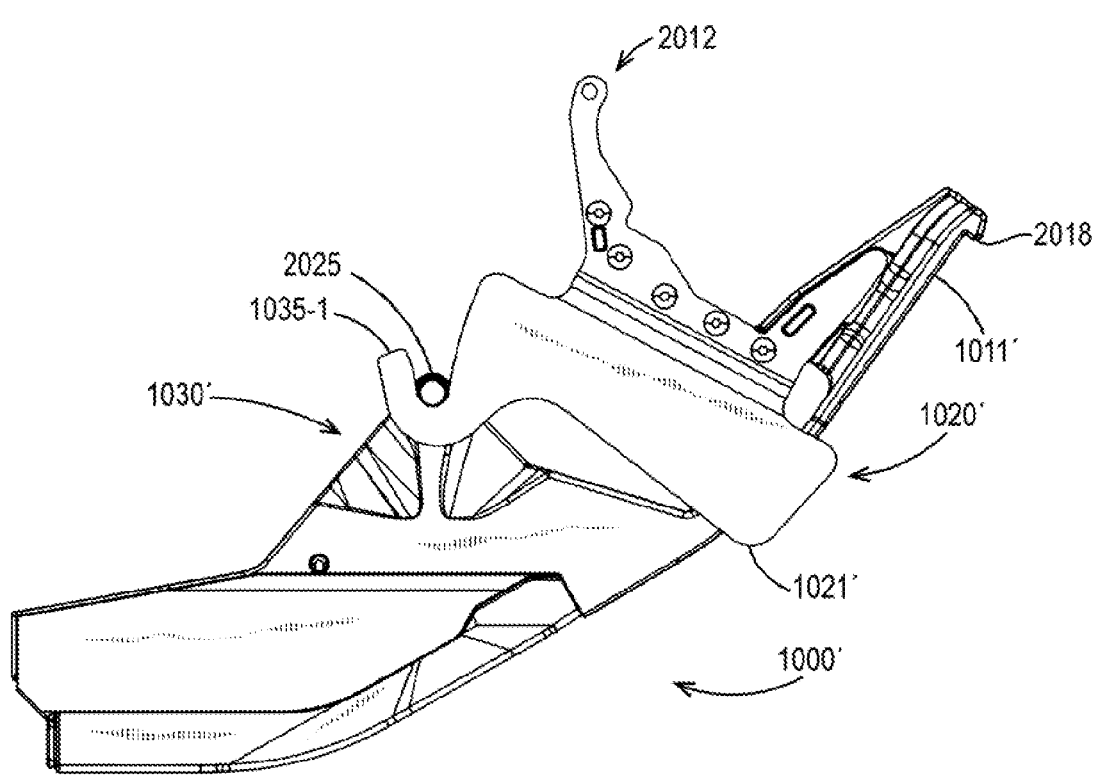
FIG. 62 is right side elevation view of the seed trench appurtenance of FIG. 61.
Figure 63:
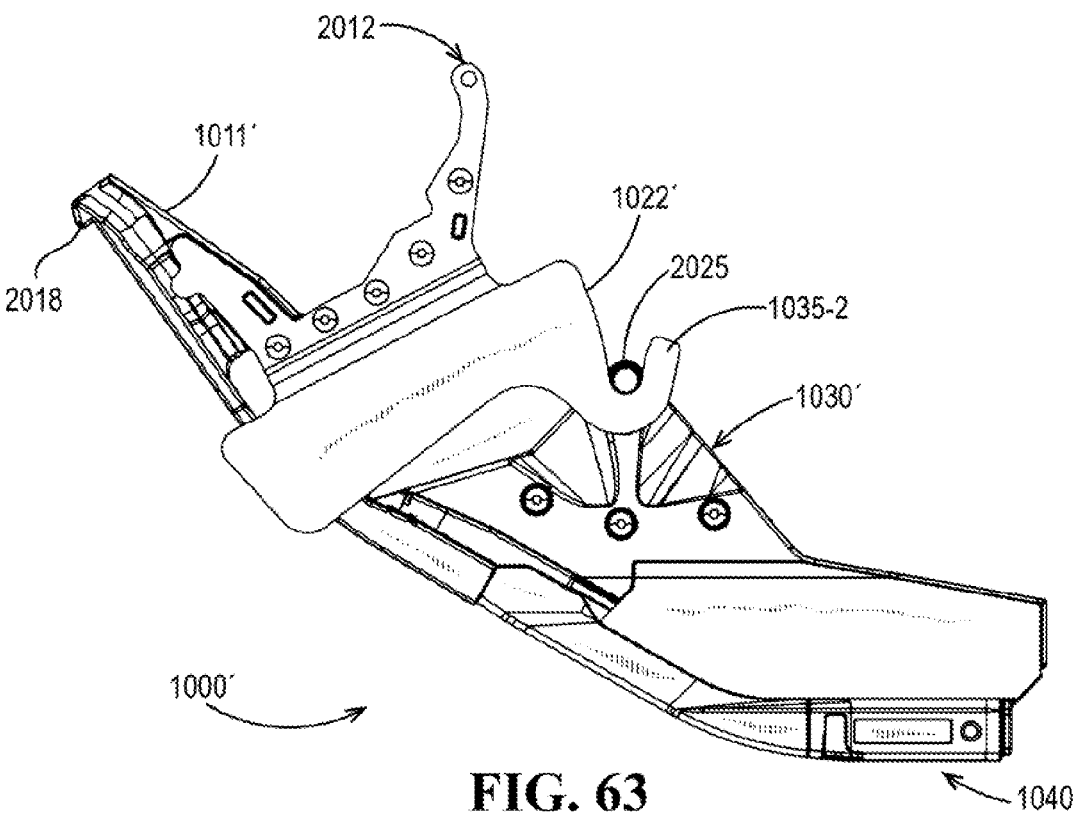
FIG. 63 is a left side elevation view of the seed trench appurtenance of FIG. 61.
Figures 64, 65:
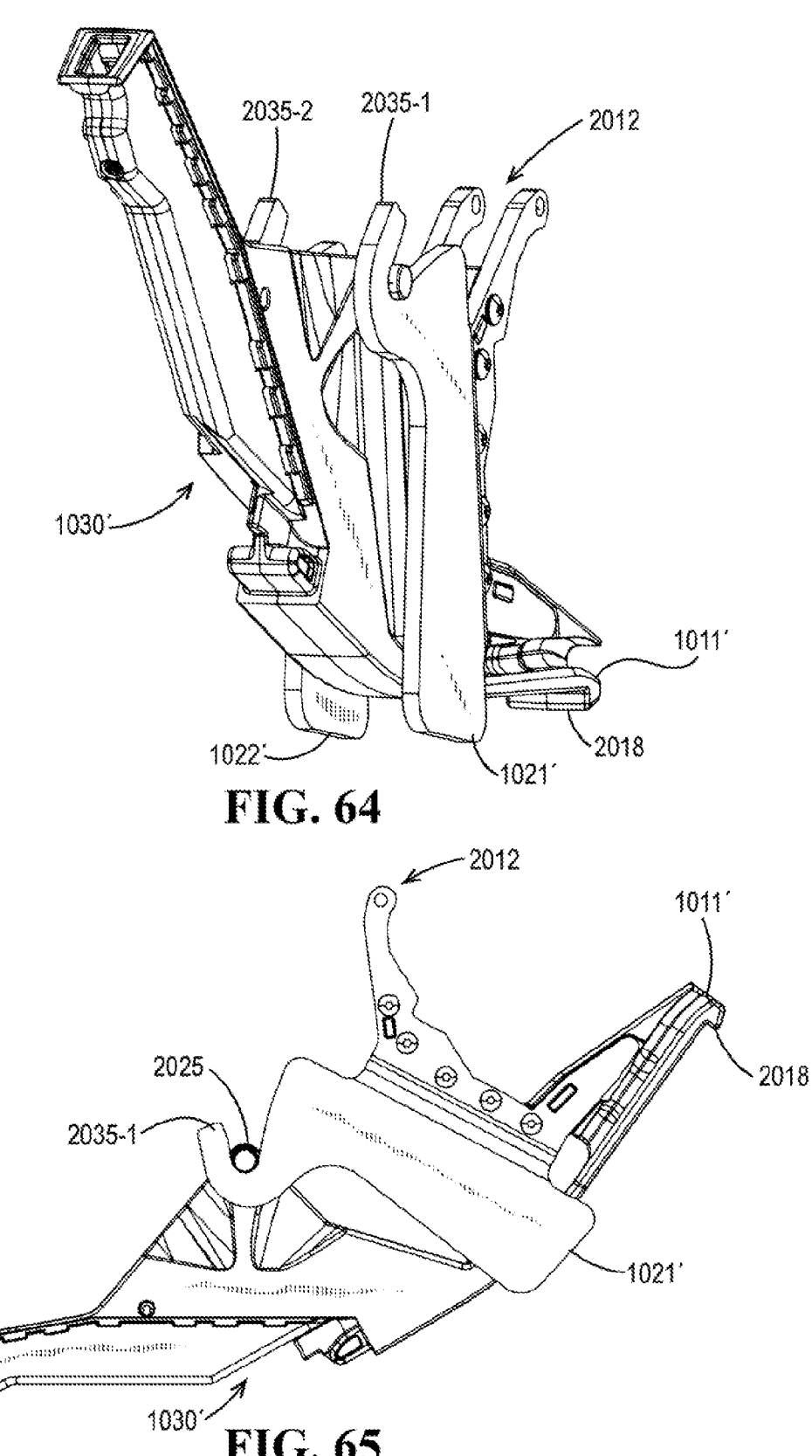
FIG. 64 is a bottom perspective view of the seed trench appurtenance of FIG. 61 with the tail removed.
FIG. 65 is right side elevation view of the seed trench appurtenance of FIG. 64.
Figure 66:
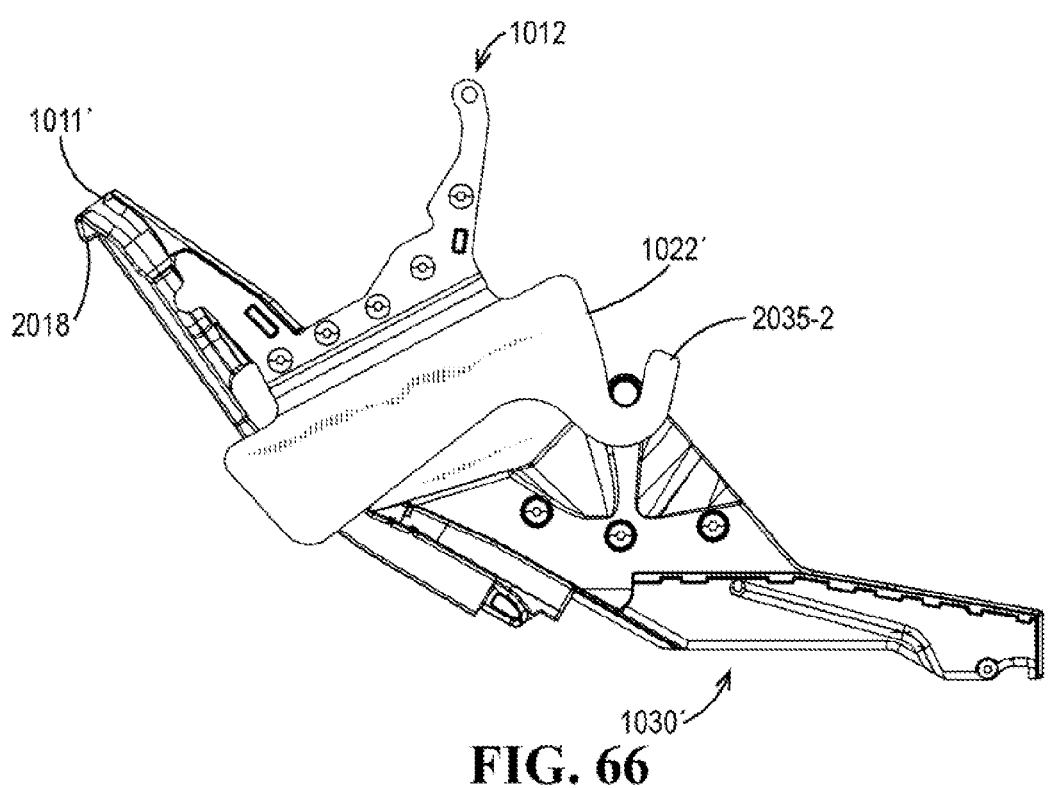
FIG. 66 is left side elevation view of the seed trench appurtenance of FIG. 64.
Figure 67:
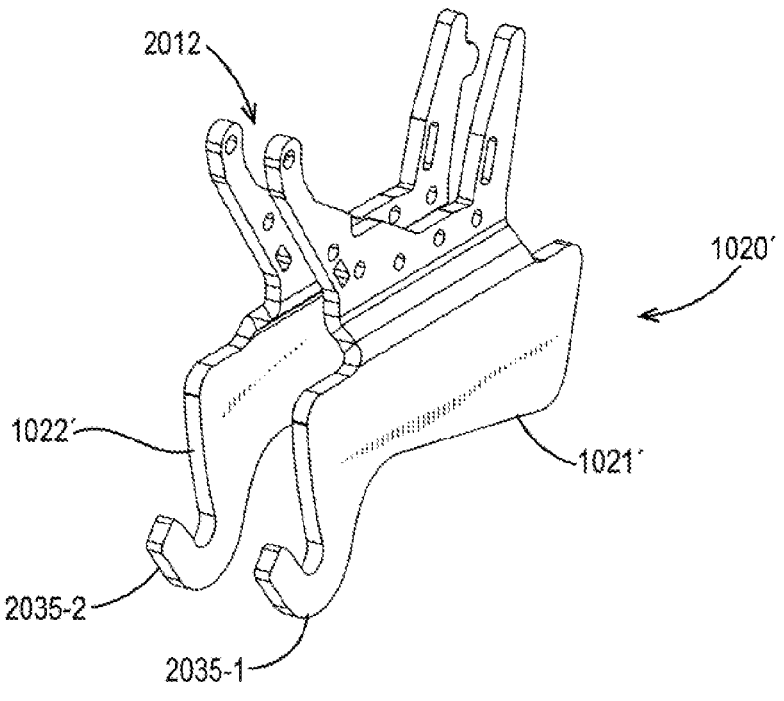
FIG. 67 is a perspective view of the frame of the seed trench appurtenance of FIG. 54.
Figure 68:
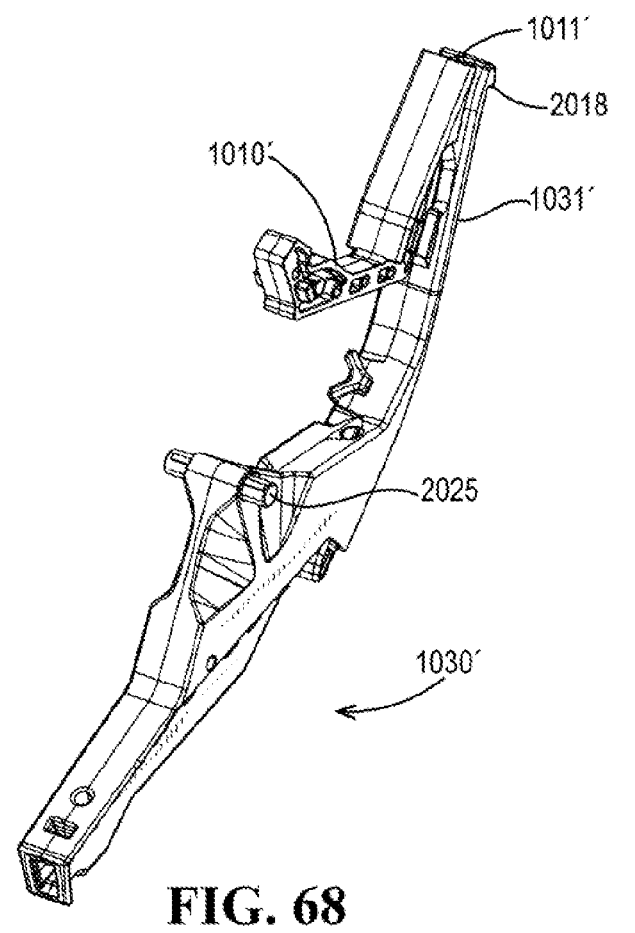
FIG. 68 is perspective view of the neck body of the seed trench appurtenance of FIG. 54.
Figure 69:
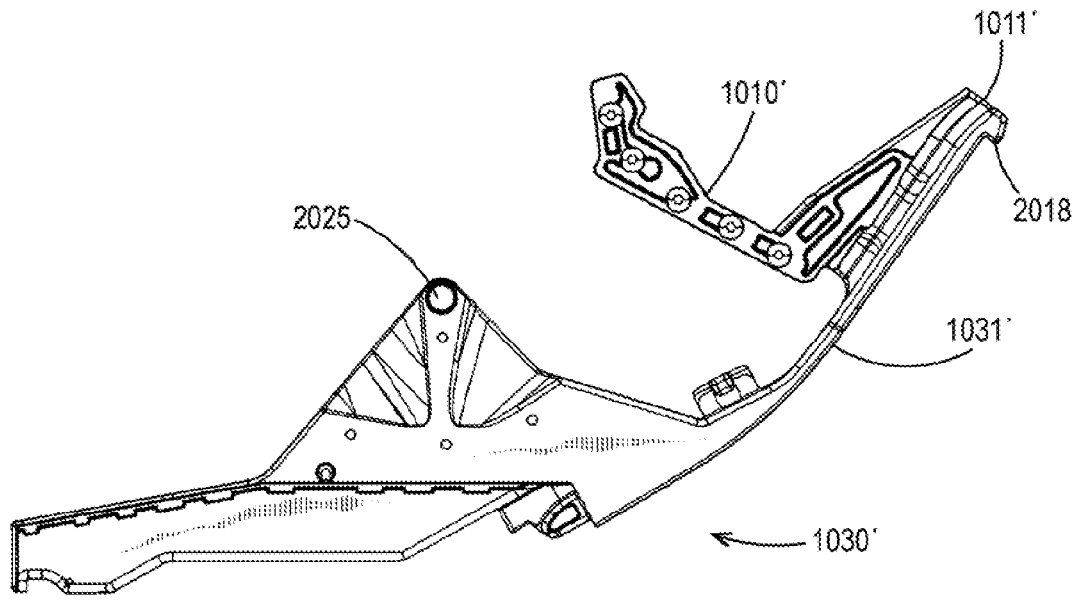
FIG. 69 is a right side elevation view of the neck body of FIG. 68.
Figure 70:
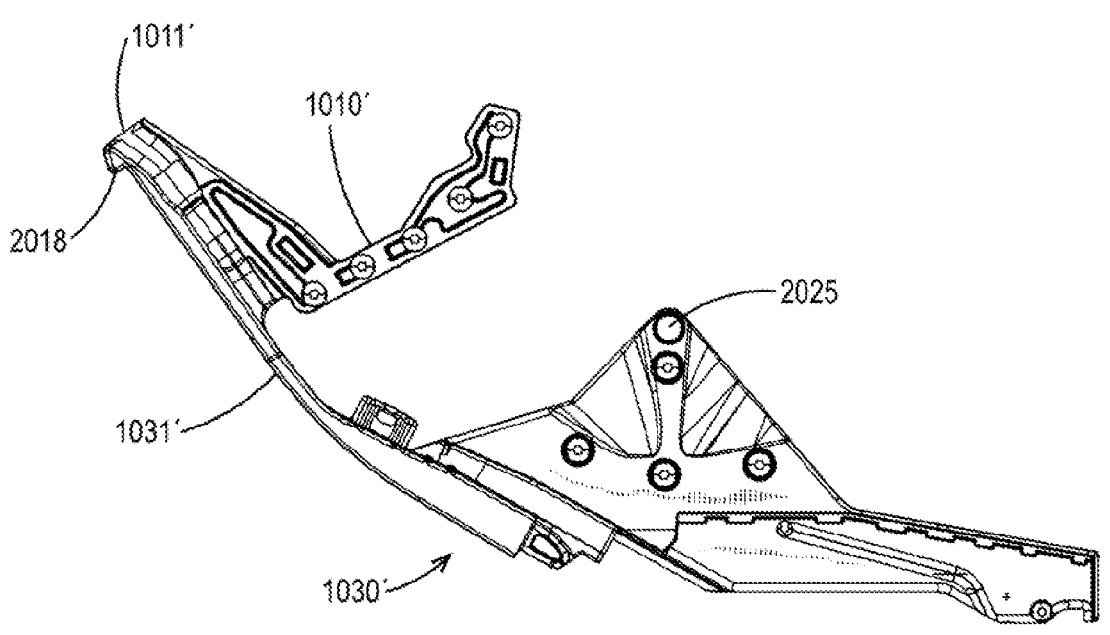
FIG. 70 is a left side elevation view of the neck body of FIG. 68.

Reversible seed trench appurtenance 1000 has a neck body 1030. Neck body 1030 is fixedly attached to frame 1020 at connection 1026 via connection 1036. Optionally, neck body 1030 is additionally fixedly attached at connection 1027 via connection 1037. Neck body 1030 has a neck 1031 connected to connection 1036 that extends downwardly from connection 1036 and provides for a resilient engagement of the reversible seed trench appurtenance 1000 with seed trench 30. Connected to neck 1031 is body 1032 and extends rearwardly from neck 1031. Connected to body 1032 is hook 1035 which extends rearwardly from body 1032. Hook 1035 will engage with post 1025. As seen in FIG. 12, as reversible seed trench appurtenance 1000 is rotated clockwise as reversible seed trench appurtenance engages with the seed trench 30, hook 1035 engages with post 1025. Hook 1035 provides increased rigid strength to reversible seed trench appurtenance 1000 than just having 1031 alone. When operated in the forward direction of travel 34, neck 1031 is flexible and provides resilient engagement of the seed trench 30, and hook 1035 is free to lift above post 1025 to provide a typical seed firmer response.

Connected to neck 1031 and extending downwardly is tail 1040. Tail 1040 can provide firming to seeds in seed trench 30 or provide deflection for rebounding seeds to direct seeds back into seed trench 30. Tail 1040 can be an entirely separate part, or a portion of tail 1040 can be part of neck body 1030. As shown, a portion of tail 1040 is part of neck body 1030. Tail 1040 can be a Keeton® seed firmer tail, or tail 1040 can be a SmartFirmer® tail. SmartFirmer tail with electronic components is described in PCT Publication Nos. WO2014153157, WO2015171908, and WO2019/070617, and U.S. Publication No. 2018/0168094. As illustrated, tail 1040 is a SmartFirmer® tail.

Upper tail portion 1041 is connected to body 1032 and hook 1035. Upper tail portion 1041 can have an optional conduit 1042 for a fluid conduit (not shown) to pass through to optional nozzle 1060. Optionally, insert 1039 extends downwardly from neck 1031 for insertion into lower tail portion 1045.

Disposed adjacent to upper tail portion 1041 are first wall 1043-1 and second wall 1043-2. First wall 1043-1 and second wall 1043-2 can be made from a wear resistant, low coefficient of friction material. One non-limiting example of suitable material for the first wall 1043-1 and second wall 1043-2 that is wear resistant and has a low coefficient of friction is ultra-high molecular weight (UHMW) polyethylene. A suitably low coefficient of friction for the first wall 1043-1 and second wall 1043-2 is in the range of less than or equal to 0.3 static and less than or equal to 0.15 dynamic as measured by ASTM D1894.

Lower tail portion 1045 has a housing 1050, which can be made from cobalt and can be the same cobalt housing from the SmartFirmer® sensor. Housing 1050 can connect to insert 1039. A window housing 1055 with window 1056 mates with housing 1050. Disposed in housing 1050 is electronics board 1056 having reflectivity sensors 350.

FIGS. 54-71 illustrate seed trench appurtenance 1000'. The location of the hook 1035 and post 1025 from seed trench appurtenance 1000 are switched. The frame 1020' will have hooks 2035-1, 2035-2, and the neck body 1030' will have the post 2025.

Figure 71:
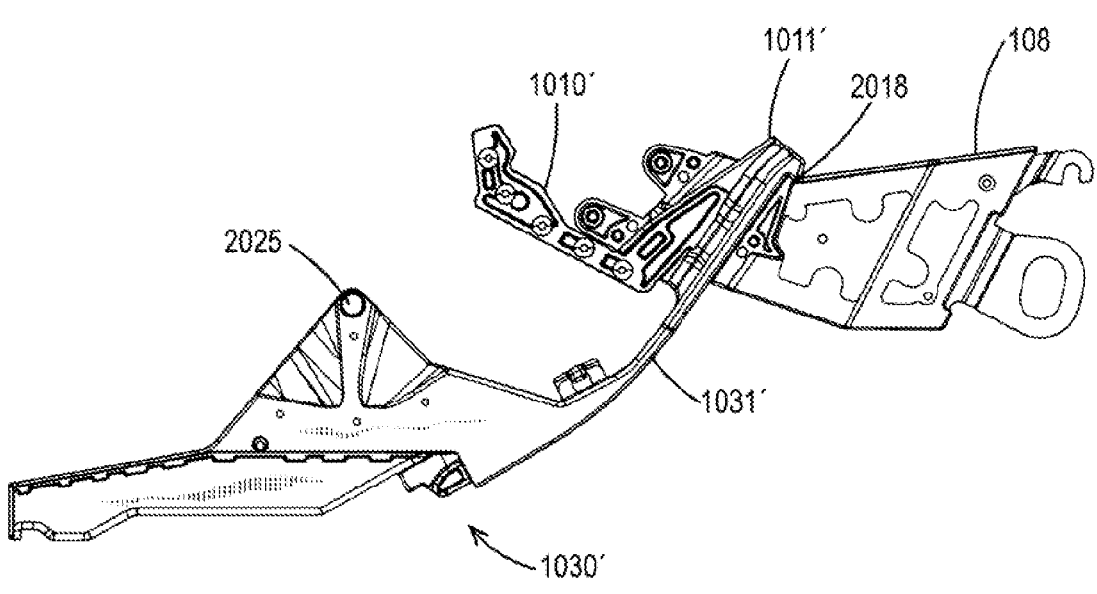
FIG. 71 is a right side elevation view of the neck body of FIG. 69 engaged with a sidewall of the mounting bracket.
Figures 72, 73:
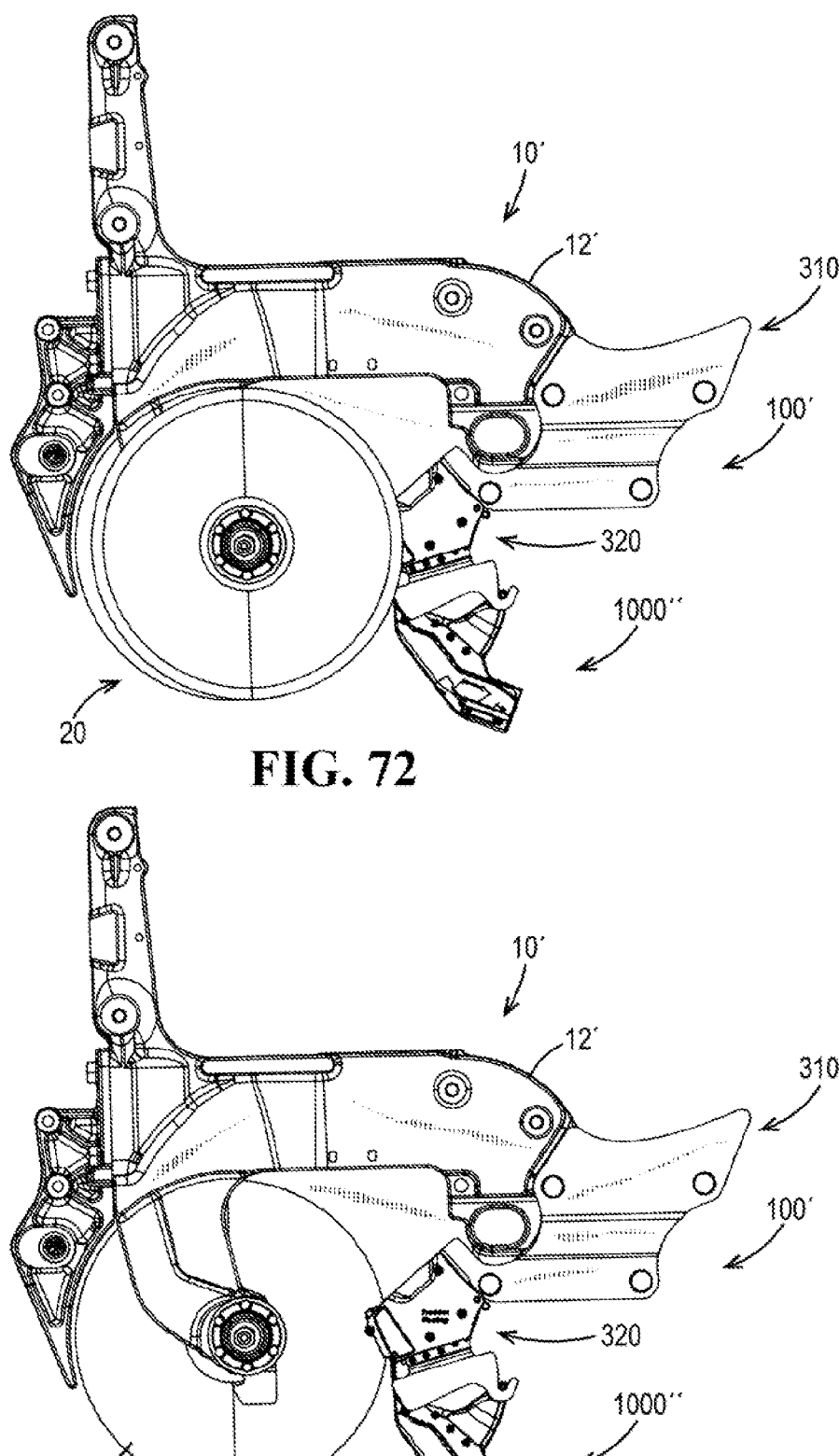
FIG. 72 is a left side elevation view of a CNH 2100 Series row unit with another seed trench appurtenance.
FIG. 73 is a left side elevation view of the row unit of FIG. 72 with the gauge wheel removed for viewing.

In this embodiment, mounting frame 1010' with arm 1011' is integral with neck body 1030', which is illustrated in FIGS. 68-71. Arm 1011' has tab 2018 for engagement with mounting bracket 100, which is illustrated in FIG. 71. Neck body 1030' has neck 1031'. Post 2025 is disposed on neck body 1030', which can engage with hooks 2035-1, 2035-2. Tail 1040 is connected to neck body 1030'. Tail 1040 is described above.

Frame 1020' is connected to mounting frame 1010', which has first and second sides 1021' and 1022'. First side 1021' has a first hook 2035-1, and second side 1022' has a second hook 2035-2. Together, first and second sides 1021' and 1022' form connection 2012, which can engage with support bracket 201. The engagement can be by pin 2013.

FIGS. 72-93 illustrate seed trench appurtenance 1000". Seed trench appurtenance 1000" is similar to seed trench appurtenance 1000', but seed trench appurtenance 1000" connects to mounting bracket 100', which attaches to a CNH 2100 series row unit.

Figures 74, 75:
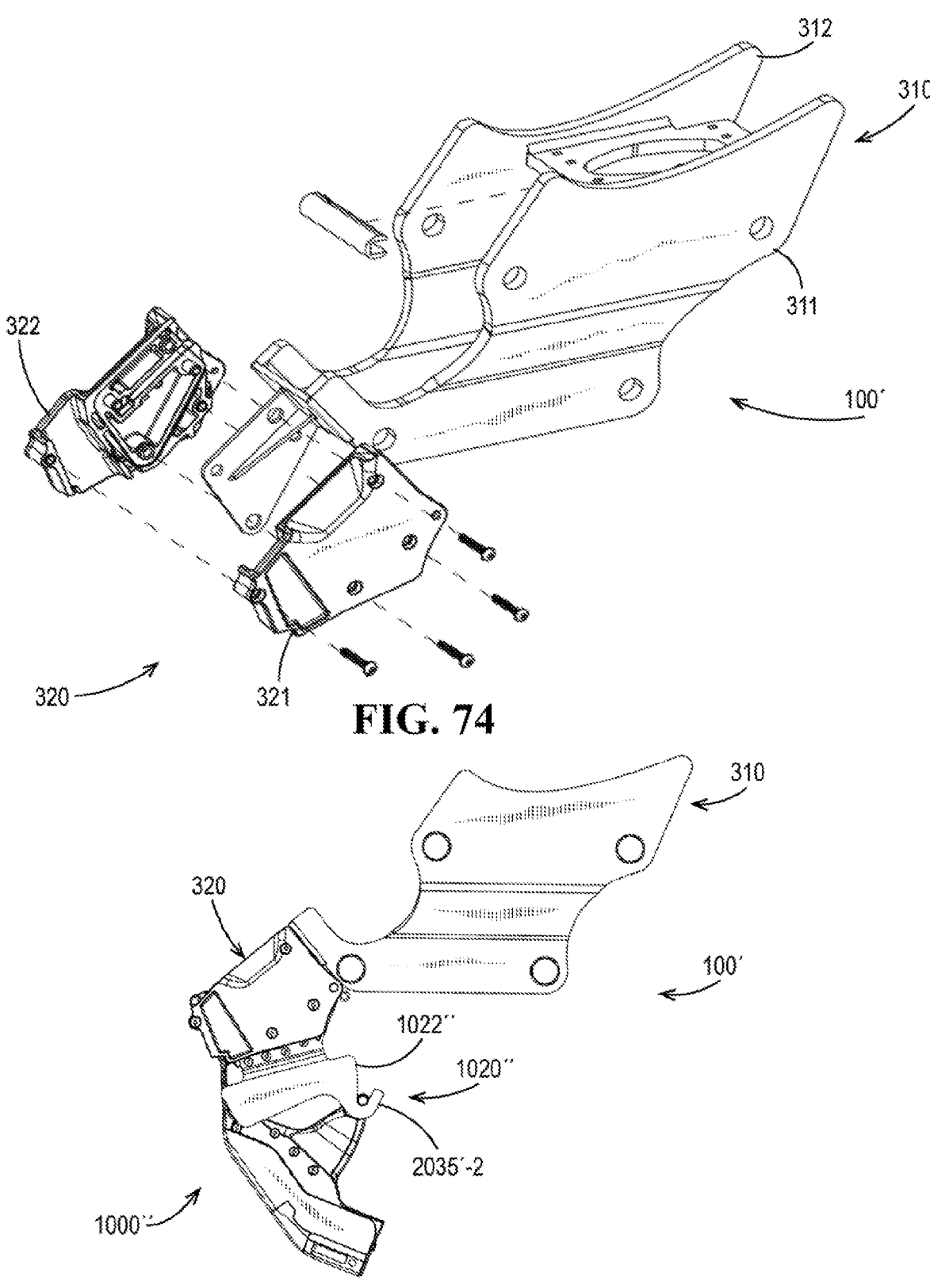
FIG. 74 is a perspective view of a mounting bracket for the row unit of FIG. 72.
FIG. 75 is a left side elevation view of the seed trench appurtenance of FIG. 72 with the mounting bracket.

Row unit 10' has frame 12' and opener 22 and opening discs 22. Mounting bracket 100' is attached to frame 12'. Mounting bracket 100' is illustrated in FIG. 74 and has mounting bracket connector 320 having first side 321 and second side 322 and mounting bracket row unit connector 310 having first side 311 and second side 312. Mounting bracket 100' is available as part number 141214 from Precision Planting LLC.

Figures 76, 77:
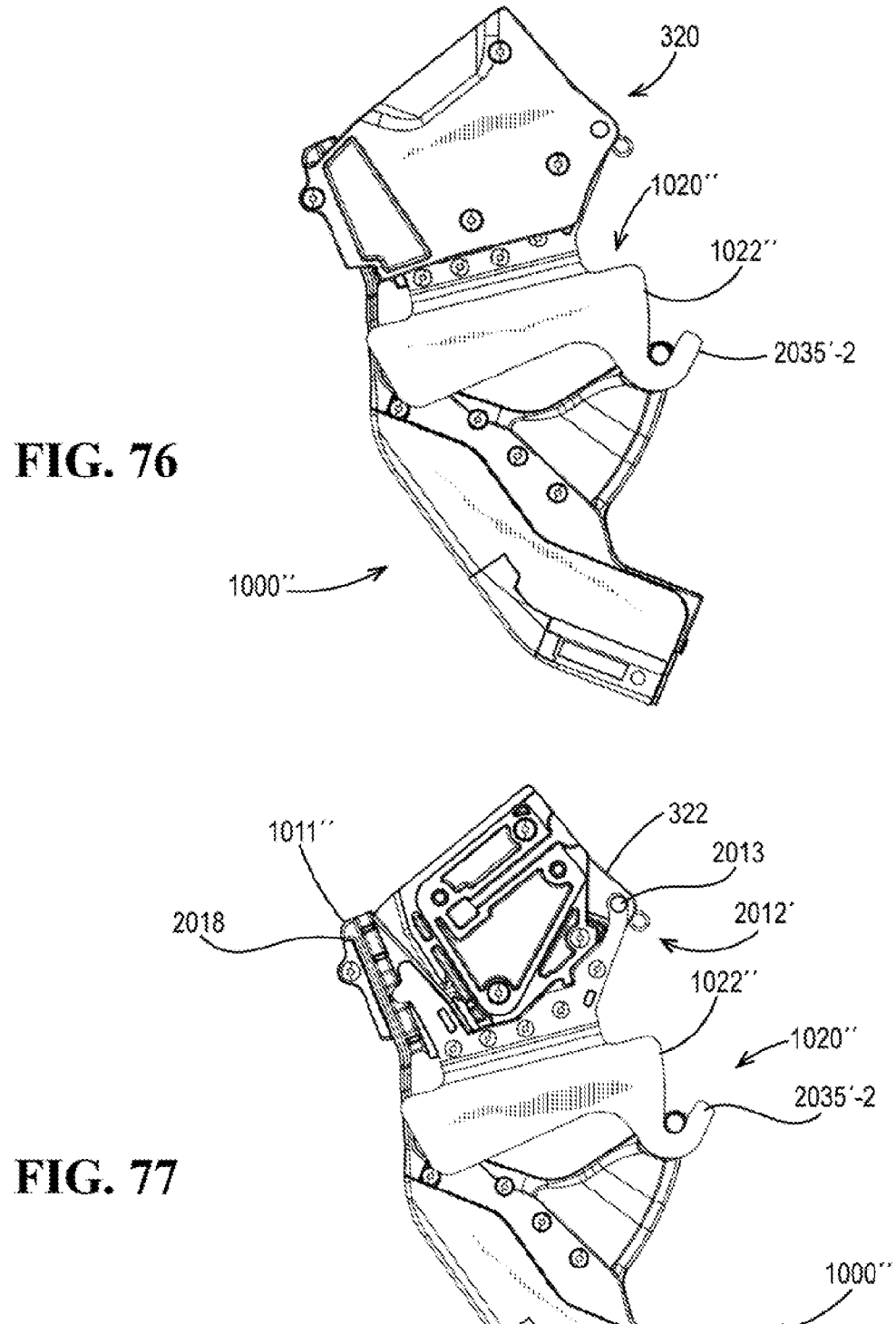
FIG. 76 is a left side elevation view of the seed trench appurtenance of FIG. 75 with the mounting bracket row unit connector removed.
FIG. 77 is a left side elevation view of the seed trench appurtenance of FIG. 76 with a side of the mounting bracket connector removed for viewing engagement of the seed trench appurtenance with the mounting bracket connector.
Figures 78, 79, 80:
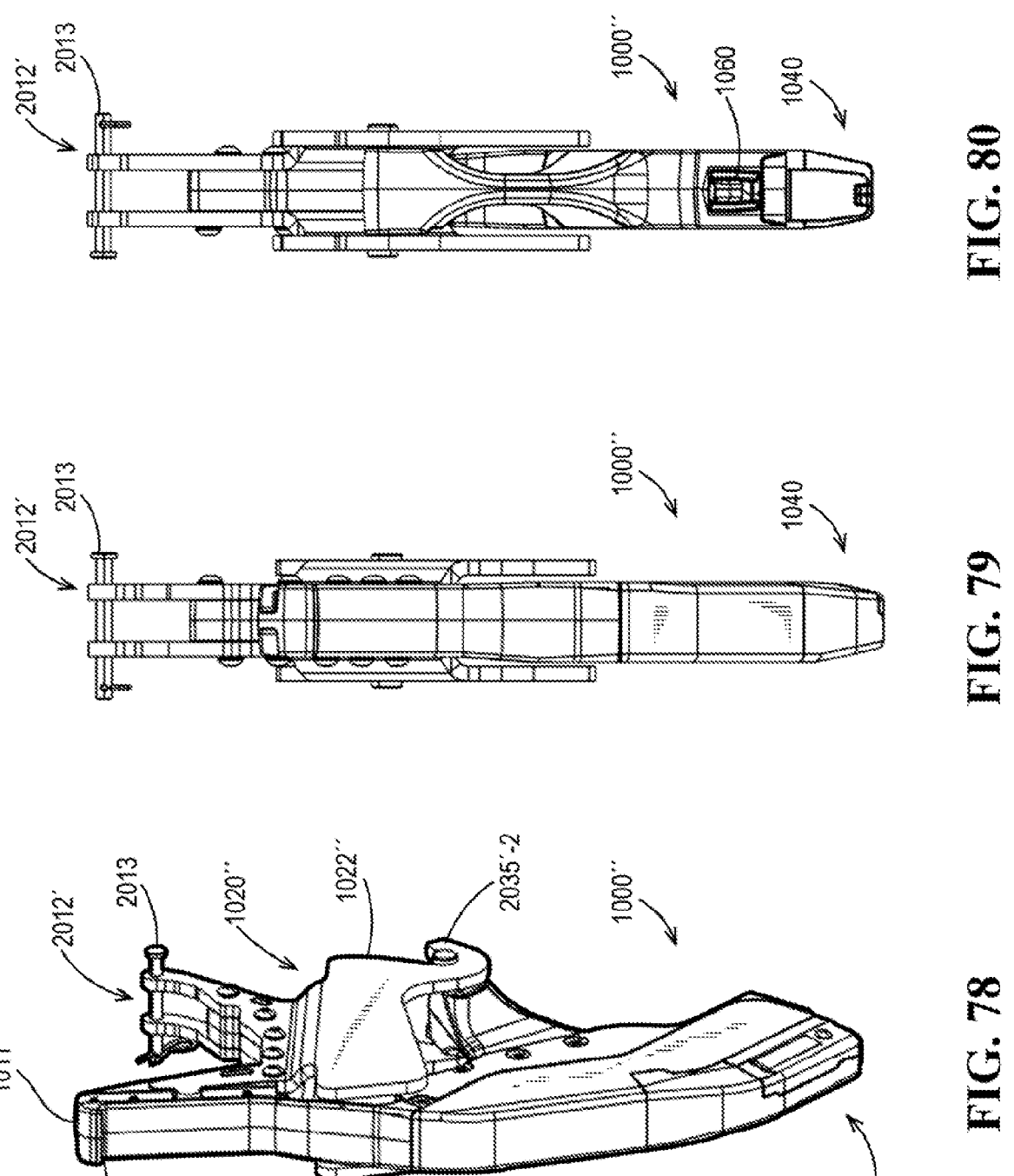
FIG. 78 is a perspective view of the seed trench appurtenance of FIG. 72.
FIG. 79 is a front elevation view of the seed trench appurtenance of FIG. 78.
FIG. 80 is a rear elevation view of the seed trench appurtenance of FIG. 78.
Figures 81, 82:
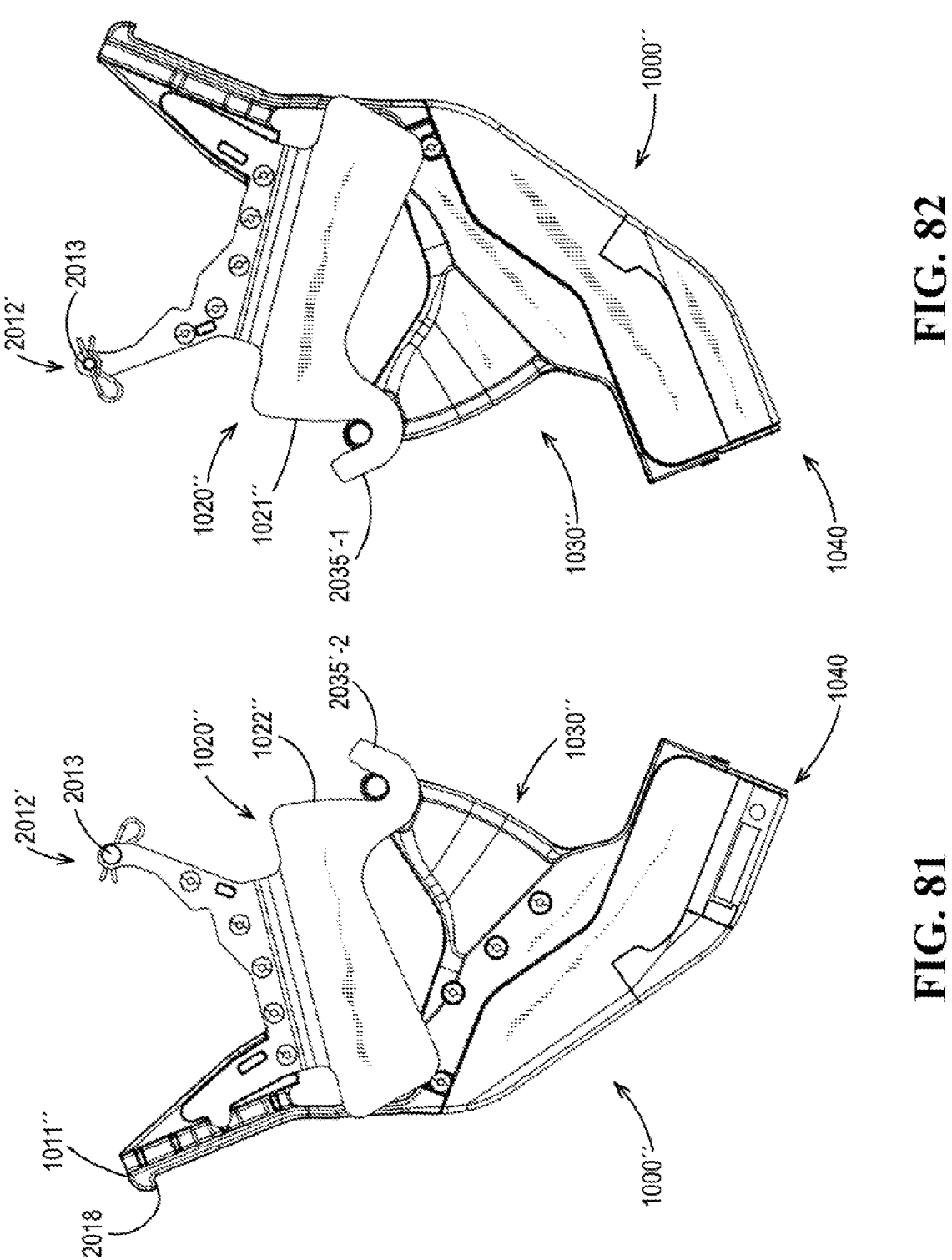
FIG. 81 is a left side elevation view of the seed trench appurtenance of FIG. 78.
FIG. 82 is a right side elevation view of the seed trench appurtenance of FIG. 78.
Figures 85, 86, 87:
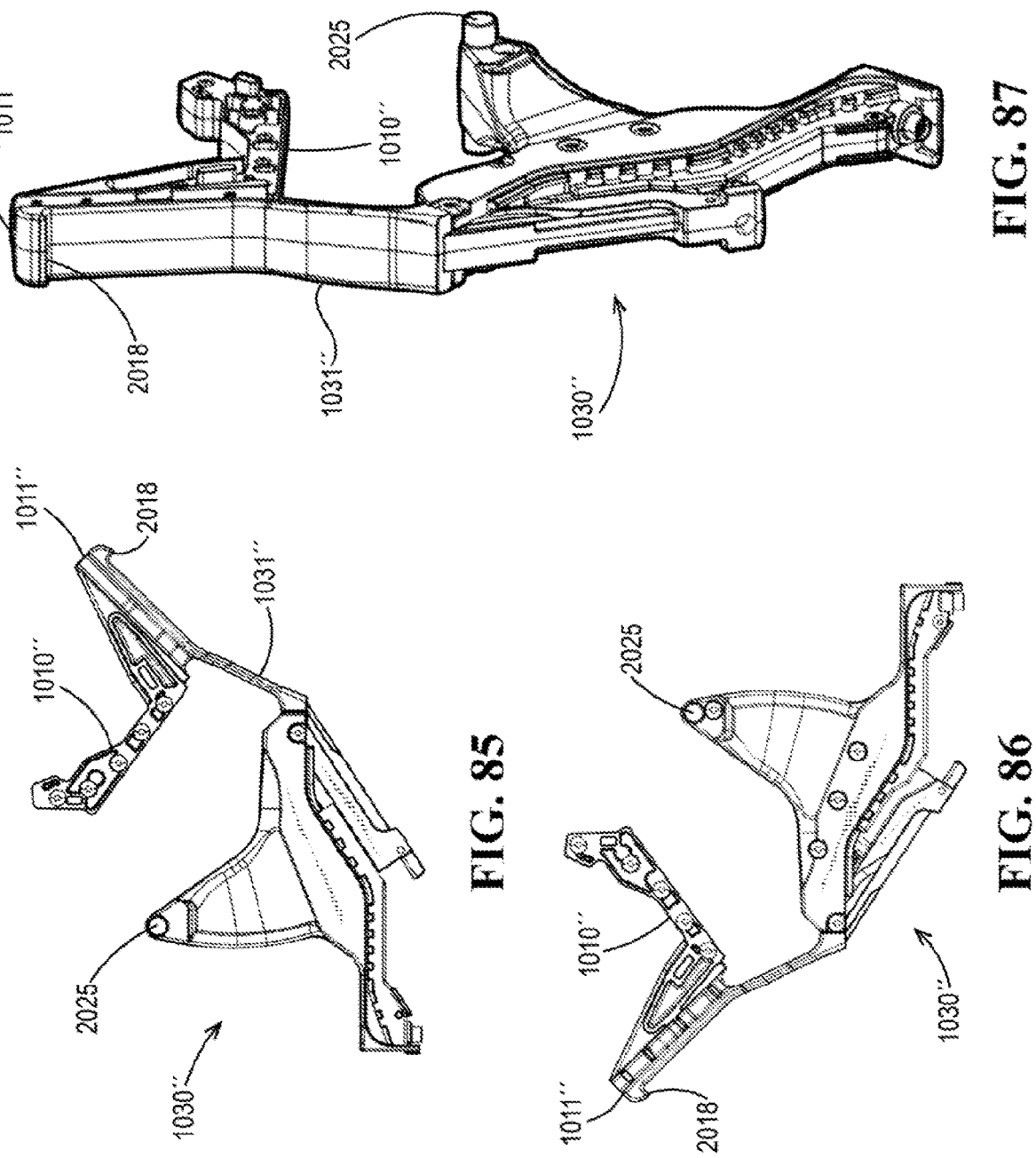
FIG. 85 is a right side elevation view of the neck body of the seed trench appurtenance of FIG. 72.
FIG. 86 is a left side elevation view of the neck body of FIG. 72.
FIG. 87 is a perspective view of the neck body of FIG. 72.

Illustrated in FIGS. 85-87, neck body 1030" is similar to neck body 1030'. Mounting frame 1010" with arm 1011" is integral with neck body 1030". Arm 1011" has tab 2018 for engagement with mounting bracket connector 320, which is illustrated in FIG. 77. Neck body 1030" has neck 1031". Post 2025 is disposed on neck body 1030", which can engage with hooks 2035'-1, 2035'-2. Tail 1040 is connected to neck body 1030". Tail 1040 is described above.

Frame 1020" is illustrated in FIGS. 88-93. Frame 1020" is connected to mounting frame 1010", which has first and second sides 1021" and 1022". First side 1021" has a first hook 2035'-1, and second side 1022" has a second hook 2035'-2. Together, first and second sides 1021" and 1022" form connection 2012', which can engage with mounting bracket connector 320. The engagement can be by pin 2013.

The following are nonlimiting examples.

Example 1—A reversible seed trench appurtenance (1000, 1000', 1000") comprising: a mounting frame (1010, 1010', 1010") operably connectable to an optional mounting bracket (100, 100'); a frame (1020, 1020', 1020") connected to the mounting frame (1010, 1010', 1010"), the frame (1020, 1020', 1020") having a first side (1021, 1021', 1021") and a second side (1022, 1022', 1022"); a neck body comprising a neck, wherein the neck body is fixedly connected to the frame (1020, 1020', 1020") or the neck body (1030, 1030', 1030") is connected to the mounting frame (1010, 1010', 1010"); a tail (1040) connected to the neck body (1030, 1030', 1030"); a post (1025, 2025); and a hook (1035, 2035-1, 2035-2, 2035'-1, 2035'-2); wherein the hook (1035, 2035-1, 2035-2, 2035'-1, 2035'-2) is engageable with the post (1025, 2025); and wherein one of: (i) the post (1025) is disposed between the first side (1021) and the second side (1022), and the neck body (1030) further comprises the hook (1035); or (ii) the hook (2035-1, 2035-2, 2035'-1, 2035'-2) comprises a first hook (2035-1, 2035'-1) and a second hook (2035-2, 2035'-2), the first side (1021', 1021") comprises the first hook (2035-1, 2035'-1), the second side (1022', 1022") comprises the second hook (2035-2, 2035'-2), and the neck body (1030', 1030") further comprises the post (2025).

Example 2—the reversible seed trench appurtenance (1000, 1000') of Example 1 further comprising the mounting bracket (100) and a support frame (201).

Example 3—the reversible seed trench appurtenance (1000, 1000') of Example 2 further comprising a row unit (10), the row unit (10) having an opening assembly (20) configured to open a seed trench in a soil surface as the row unit advances in a forward direction of travel, wherein the mounting bracket (100) is attached to a shank (14) of the row unit (10), and the support frame (201) is connected to a frame (12) of the row unit (10).

Example 4—the reversible seed trench appurtenance (1000") of Example 1 further comprising the mounting bracket (100'), a row unit (10'), the row unit (10') having an opening assembly (20) configured to open a seed trench in a soil surface as the row unit (10') advances in a forward direction of travel, wherein the mounting bracket (100') comprises a mounting bracket connector (320) and a mounting bracket row unit connector (310), wherein the mounting bracket row unit connector (310) is connected to a frame (12') of the row unit (10'), and wherein the reversible seed trench appurtenance (1000") is connected to the mounting bracket connector (320).

Example 5—the reversible seed trench appurtenance (1000, 1000', 1000") of Example 3 or 4, wherein when the row unit (10, 10') is reversed in a direction opposite the forward direction of travel, the seed trench appurtenance (1000, 1000', 1000") moves from a normal operating position to a reversing position thereby avoiding damage to the seed trench appurtenance (1000, 1000', 1000"), and the hook (1035, 2035-1, 2035-2, 2035'-1, 2035'-2) engages with the post (1025, 2025).

Example 6—the reversible seed trench appurtenance (1000, 1000') of any of Examples 1, 2, 3 or 5, wherein the post (1025) is disposed between the first side (1021) and the second side (1022), and the neck body (1030) further comprises the hook (1035).

Example 7—the reversible seed trench appurtenance (1000) of any of Examples 1, 2, 3, 5, or 6, wherein the neck body (1030) is fixedly connected to the frame (1020).

Example 8—the reversible seed trench appurtenance (1000) of any of Examples 1, 2, 3, 5, 6, or 7, wherein the mounting frame (1010) has a notch (2018) that engages with a flange (108) of the mounting bracket (100) to secure the mounting frame (1010) to the mounting bracket (100).

Example 9—the reversible seed trench appurtenance (1000, 1000') of any of Examples 1, 2, 3, 5, 6, 7, or 8, wherein the mounting frame (1010, 1010') is connected to the support frame (201).

Example 10—the reversible seed trench appurtenance (1000', 1000") of any of Example 1 to 5, wherein the hook (2035-1, 2035-2, 2035'-1, 2035'-2) comprises the first hook (2035-1, 2035'-1) and the second hook (2035-2, 2035'-2), the first side (1021', 1021") comprises the first hook (2035-1, 2035'-1), the second side (1022', 1022") comprises the second hook (2035-2, 2035'-2), and the neck body (1030', 1030") further comprises the post (2025).

Example 11—the reversible seed trench appurtenance (1000', 1000") of Example 10, wherein the neck body (1030', 1030") is integral with the mounting frame (1010', 1010").

Example 12—the reversible seed trench appurtenance (1000', 1000") of any of Examples 2, 3, 4, 5, 10, or 11, wherein the mounting frame (1010', 1010") has a tab (2018) that engages with the mounting bracket (100, 100') to secure the mounting frame (1010', 1010") to the mounting bracket (100, 100').

Example 13—the reversible seed trench appurtenance (1000', 1000") of any of Examples 2, 3, 5, 10, 11, or 12, wherein the frame (1020', 1020") has a connection (1012, 1012') for connecting with the support bracket (201).

Example 14—the reversible seed trench appurtenance (1000") of any of Examples 4, 10, 11, or 12, wherein the frame (1020") has a connection (1012") for connecting with the mounting bracket connector (320).

Example 15—the reversible seed trench appurtenance (1000, 1000', 1000") of any preceding Example, wherein the tail (1040) has an upper portion (1041) that is part of the neck body (1030, 1030', 1030") and a lower portion (1045) that is separate from the upper portion (1041).

The foregoing description is presented to enable one of ordinary skill in the art to make and use the invention and is provided in the context of a patent application and its requirements. Various modifications to the preferred embodiments of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A reversible seed trench appurtenance comprising:
a row unit, the row unit having an opening assembly configured to open a seed trench in a soil surface as the row unit advances in a forward direction of travel;
a mounting frame operably connectable to a mounting bracket, wherein the mounting bracket is attached to a shank of the row unit;
a support frame connected to a frame of the row unit;
a frame connected to the mounting frame, the frame having a first side and a second side;
a neck body comprising a neck, wherein the neck body is fixedly connected to the frame or the neck body is connected to the mounting frame;
a tail connected to the neck body;
a post; and
a hook;
wherein the hook is engageable with the post; and wherein one of:
(i) the post is disposed between the first side and the second side, and the neck body further comprises the hook; or
(ii) the hook comprises a first hook and a second hook, the first side comprises the first hook, the second side comprises the second hook, and the neck body further comprises the post.

2. The reversible seed trench appurtenance of claim 1, wherein the mounting bracket comprises a mounting bracket connector and a mounting bracket row unit connector, wherein the mounting bracket row unit connector is connected to the frame of the row unit, and wherein the reversible seed trench appurtenance is connected to the mounting bracket connector.

3. The reversible seed trench appurtenance of claim 1, wherein when the row unit is reversed in a direction opposite the forward direction of travel, the seed trench appurtenance moves from a normal operating position to a reversing position thereby avoiding damage to the seed trench appurtenance, and the hook engages with the post.

4. The reversible seed trench appurtenance of claim 1, wherein the post is disposed between the first side and the second side, and the neck body further comprises the hook.

5. The reversible seed trench appurtenance of claim 1, wherein the neck body is fixedly connected to the frame.

6. The reversible seed trench appurtenance of claim 1, wherein the mounting frame has a notch that engages with a flange of the mounting bracket to secure the mounting frame to the mounting bracket.

7. The reversible seed trench appurtenance of claim 1, wherein the mounting frame is connected to the support frame.

8. The reversible seed trench appurtenance of claim 1, wherein the hook comprises the first hook and the second hook, the first side comprises the first hook, the second side comprises the second hook, and the neck body further comprises the post.

9. The reversible seed trench appurtenance of claim 8, wherein the neck body is integral with the mounting frame.

10. A reversible seed trench appurtenance comprising:
a mounting frame operably connectable to a mounting bracket;
a frame connected to the mounting frame, the frame having a first side and a second side;
a neck body comprising a neck, wherein the neck body is fixedly connected to the frame or the neck body is connected to the mounting frame;
a tail connected to the neck body;
a post; and
a hook;
wherein the hook is engageable with the post; and
wherein one of:
(i) the post is disposed between the first side and the second side, and the neck body further comprises the hook; or
(ii) the hook comprises a first hook and a second hook, the first side comprises the first hook, the second side comprises the second hook, and the neck body further comprises the post;
wherein the mounting frame has a tab that engages with the mounting bracket to secure the mounting frame to the mounting bracket.

11. The reversible seed trench appurtenance of claim 2, wherein the frame has a connection for connecting with the mounting bracket connector.

12. The reversible seed trench appurtenance of claim 1, wherein the tail has an upper portion that is part of the neck body and a lower portion that is separate from the upper portion.

\* \* \* \* \*